US011741278B2

(12) United States Patent
Pandey et al.

(10) Patent No.: US 11,741,278 B2
(45) Date of Patent: Aug. 29, 2023

(54) CONTEXT PROJECTION AND WIRE EDITING IN AUGMENTED MEDIA

(71) Applicant: International Business Machines Corporation, Armonk, NY (US)

(72) Inventors: Diwesh Pandey, Bangalore (IN); Subarna Ghosh, Maharashtra (IN); Prashansha Gupta, Tamil Nadu (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/567,225

(22) Filed: Jan. 3, 2022

(65) Prior Publication Data
US 2023/0214560 A1    Jul. 6, 2023

(51) Int. Cl.
*G06F 30/31* (2020.01)
*G06F 30/394* (2020.01)
*G06T 19/00* (2011.01)
*G06F 111/18* (2020.01)

(52) U.S. Cl.
CPC ............ *G06F 30/31* (2020.01); *G06F 30/394* (2020.01); *G06T 19/006* (2013.01); *G06F 2111/18* (2020.01)

(58) Field of Classification Search
CPC .... G06F 30/31; G06F 30/394; G06F 2111/18; G06T 19/006
See application file for complete search history.

(56) References Cited

U.S. PATENT DOCUMENTS

| 5,867,399 A * | 2/1999 | Rostoker .......... G01R 31/31704 714/E11.167 |
| 6,256,769 B1 | 7/2001 | Tamarkin et al. |
| 6,614,260 B1 * | 9/2003 | Welch .............. H03K 19/17732 326/38 |
| 8,166,442 B2 * | 4/2012 | Hetzel .................. G06F 30/394 716/129 |
| 8,250,514 B1 * | 8/2012 | Wadland ............... G06F 30/394 716/128 |
| 8,732,629 B2 * | 5/2014 | Tong ................... G03F 7/70433 716/54 |
| 8,869,077 B1 * | 10/2014 | Ghaida ................ G06F 30/398 716/51 |

(Continued)

OTHER PUBLICATIONS

Hahn, "Augmented reality-based training of the PCB assembly process", ResearchGate, Nov. 2015, 6p.

(Continued)

*Primary Examiner* — Motilewa Good-Johnson
(74) *Attorney, Agent, or Firm* — Teddi Maranzano; Cantor Colburn LLP

(57) ABSTRACT

Embodiments are for using design context projection and wire editing in augmented media. Responsive to receiving an indication of an error in a design for an integrated circuit (IC), a localized area is extracted encompassing the error in the design. Augmented reality media of the localized area of the design is generated with a guide pattern, the localized area including objects. The augmented reality media of the localized area is caused to be presented in a three-dimensional (3D) projection on an augmented reality device for a user. Responsive to receiving at least one modification to the augmented media in the 3D projection, the design for the IC is updated with the modifications.

20 Claims, 16 Drawing Sheets

(56) References Cited

U.S. PATENT DOCUMENTS

| | | | | |
|---|---|---|---|---|
| 9,286,420 | B1* | 3/2016 | Krishnan | G06F 30/39 |
| 9,390,215 | B2* | 7/2016 | Fox | H01L 23/5286 |
| 10,366,521 | B1* | 7/2019 | Peacock | G02B 27/017 |
| 10,503,862 | B1* | 12/2019 | Ghosh | G06F 30/394 |
| 11,233,515 | B2* | 1/2022 | Vasquez Lopez | H10N 60/01 |
| 11,562,531 | B1* | 1/2023 | Krol | G06T 15/04 |
| 2008/0098341 | A1* | 4/2008 | Kobayashi | G06F 30/398 |
| | | | | 716/55 |
| 2010/0097107 | A1* | 4/2010 | Dartu | G06F 30/327 |
| | | | | 716/113 |
| 2011/0164163 | A1* | 7/2011 | Bilbrey | H04N 23/632 |
| | | | | 348/E5.022 |
| 2013/0117001 | A1* | 5/2013 | Goo | G06F 30/367 |
| | | | | 703/13 |
| 2014/0181602 | A1* | 6/2014 | Mittal | G11C 29/10 |
| | | | | 714/720 |
| 2017/0371998 | A1* | 12/2017 | Krauch | G06F 30/3312 |
| 2018/0136255 | A1* | 5/2018 | Albert | G01R 31/2806 |
| 2018/0247006 | A1* | 8/2018 | Dai | G06F 30/18 |
| 2020/0104449 | A1* | 4/2020 | Pandey | G06F 30/394 |
| 2020/0218789 | A1* | 7/2020 | Li | G06F 30/394 |
| 2021/0182639 | A1* | 6/2021 | Brent | G06K 19/06046 |
| 2021/0239737 | A1* | 8/2021 | Swett | G01R 13/029 |
| 2022/0352441 | A1* | 11/2022 | Lutgen | H01L 33/62 |
| 2023/0010661 | A1* | 1/2023 | Chen | G06F 30/398 |
| 2023/0038321 | A1* | 2/2023 | Pandey | G06F 30/394 |
| 2023/0083703 | A1* | 3/2023 | Meiners | G06T 17/00 |
| | | | | 382/154 |

OTHER PUBLICATIONS

Inspectar, "A Better Platform for Testing Circuit Boards", IEEE; Jun. 30, 2021, 28p.

Kumar, "Virtuosity: Concurrently Editing a Hierarchial Cellview"; Cadence.com Apr. 15, 2020; 4p.

Numfu, "A Concept for Virtual Reality Based Industrial Maintenance Training Preparation"; ResearchGate, Aug. 2020, 11p.

Ojer, "Projection-Based Augmented Reality Assistance for Manual Electronic Component Assembly Processes," Jan. 22, 2020, Appl. Sci 2020,10, 796; 13p.

Thiwanka, "Augmented Reality Based Breadboard Circuit Building Guide Application", Researchgate, Dec. 2018, 7p.

Buchmann et al., "FingARtips—Gesture Based Direct Manipulation in Augmented Reality," ResearchGate, Jun. 2004, 11 pages.

Garbade, "Top 4 open source augmented realisty SDKs," Opensource.com, Jun. 13, 2018, 7 pages.

Rakhunde et al., "Implementation of Traditional 2d Website into 3D by Using Augmented Reality," International Journal of Innovative Research in Technology, vol. 8, No. 1, Jun. 2021, pp. 1106-1109.

* cited by examiner

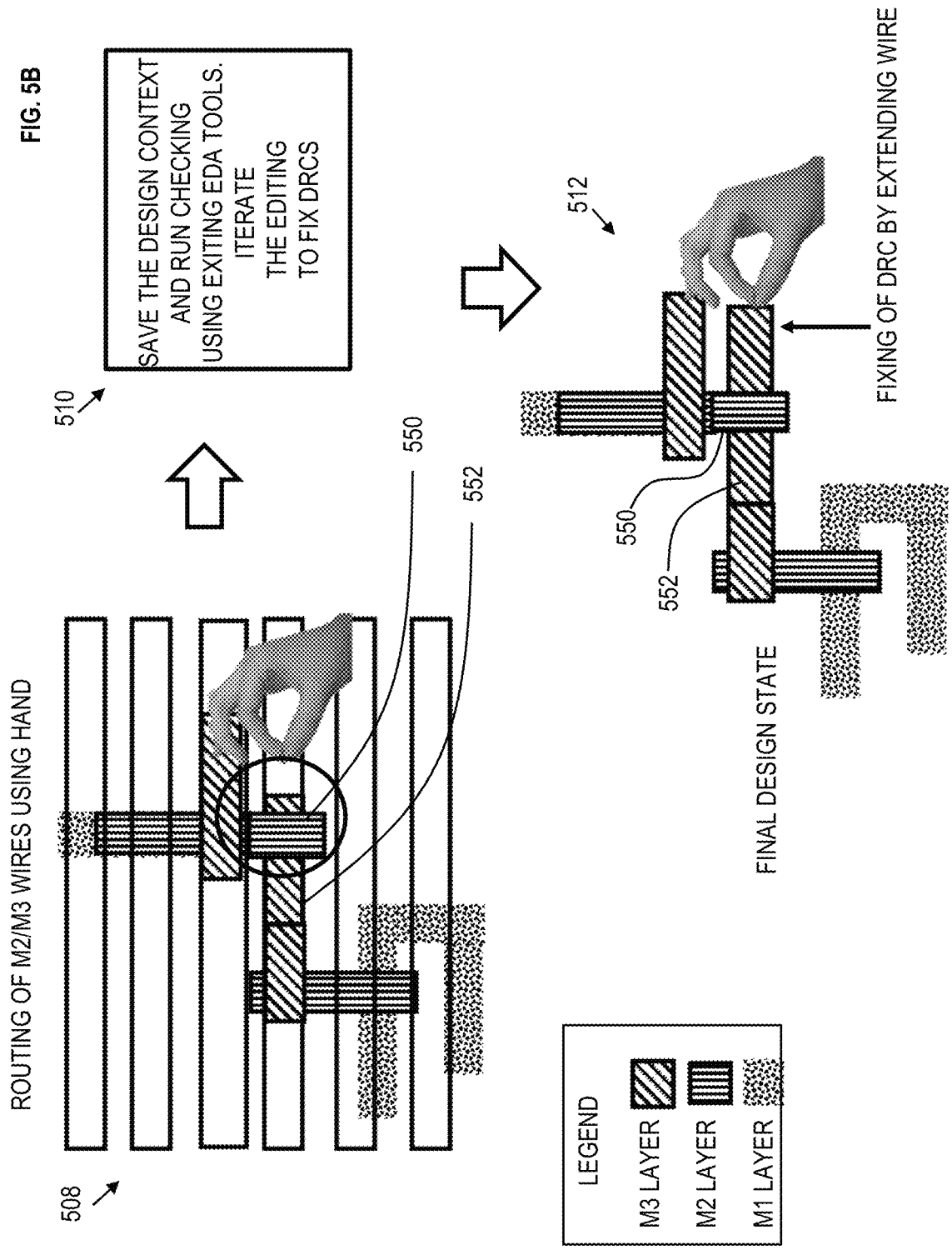

FIG. 6
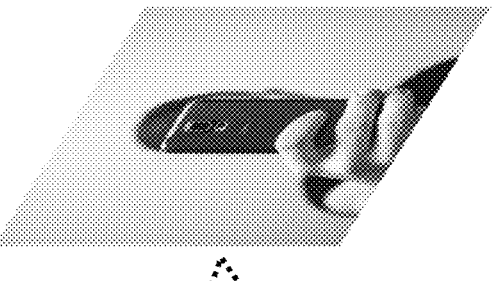
$O_{REF}$ - REFERENCE IN TOP VIEW PROJECTION
$O'_{REF}$ - REFERENCE IN SIDE VIEW PROJECTION
$O'_{REF} = \alpha \cdot O_{REF}$
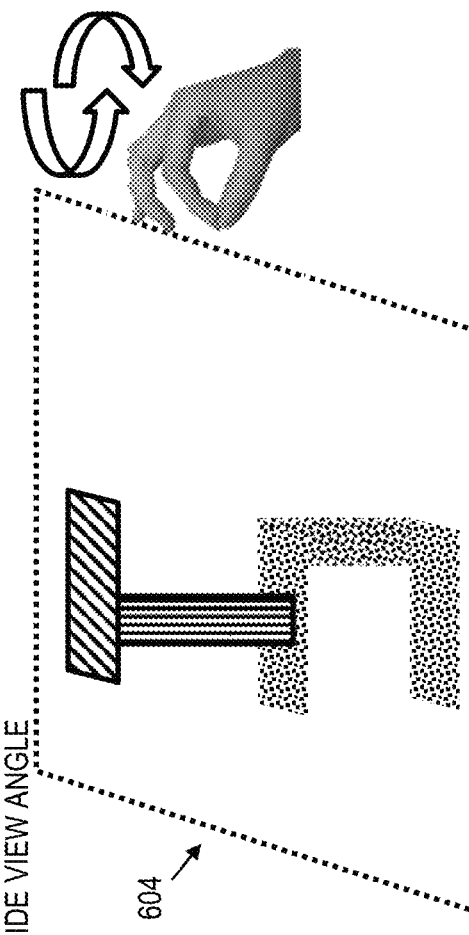
SIDE VIEW PROJECTION: ROTATE FINGERS TO CHANGE SIDE VIEW ANGLE
604
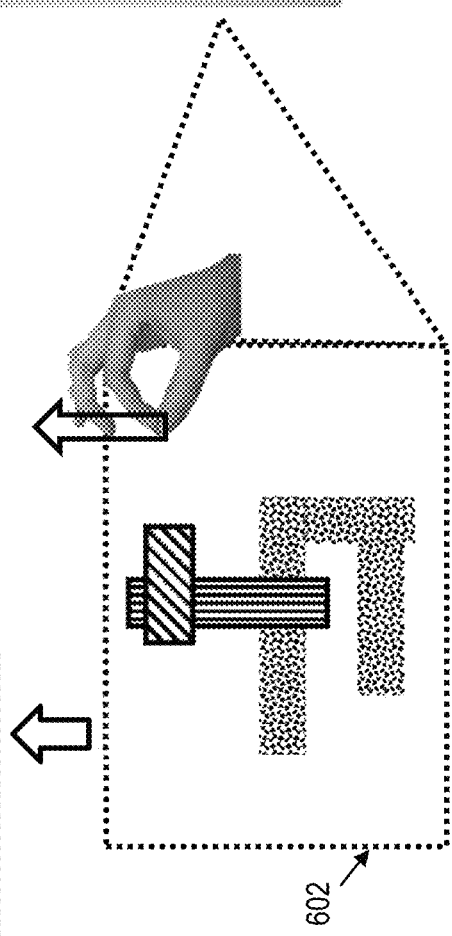
CAMERA OR AUGMENTED GEAR
TOP VIEW PROJECTION: PINCHING MOTION TO CHANGE PERSPECTIVE
602
$O_{REF}$
$O'_{REF}$
LEGEND
M3 LAYER
M2 LAYER
M1 LAYER

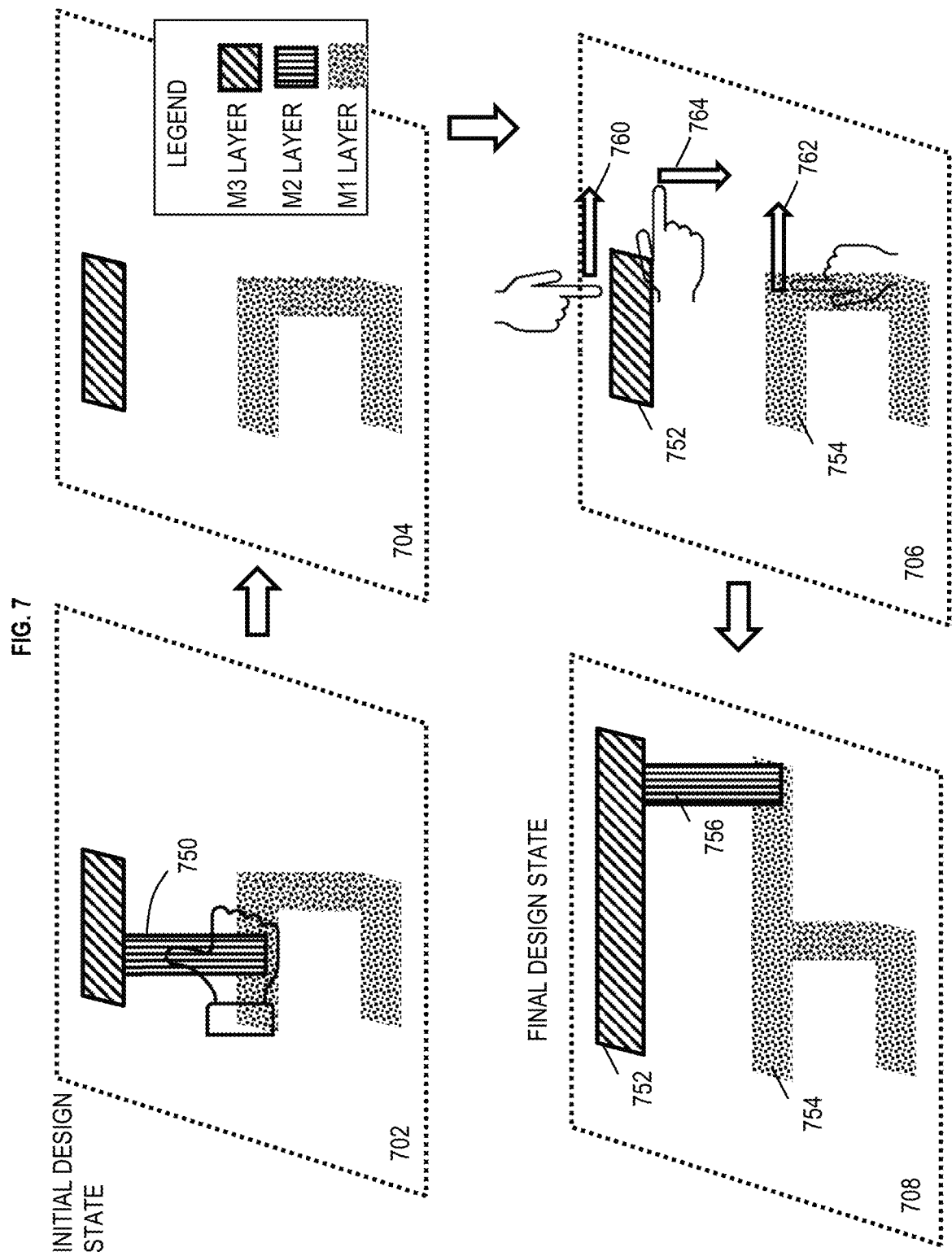

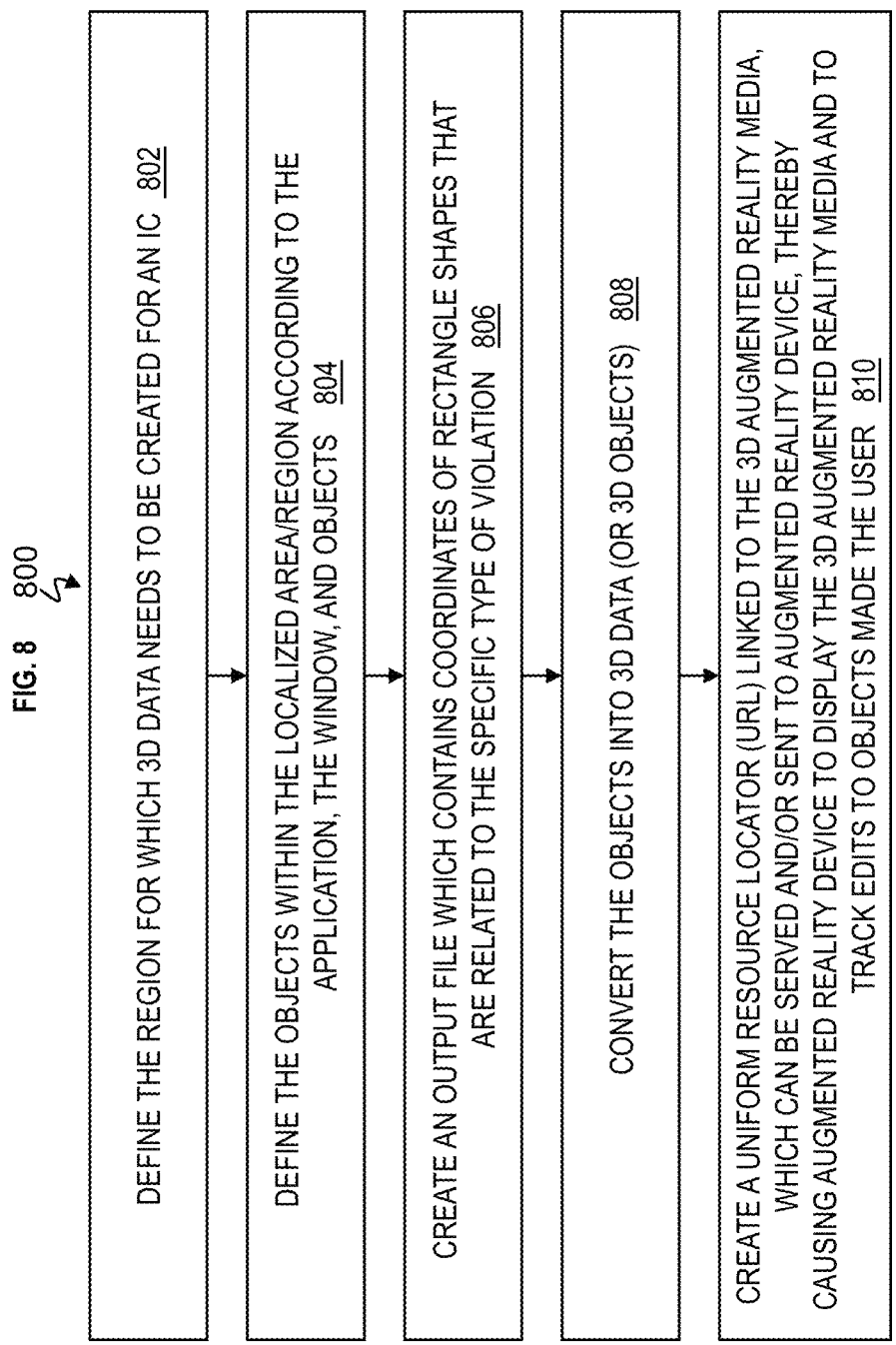

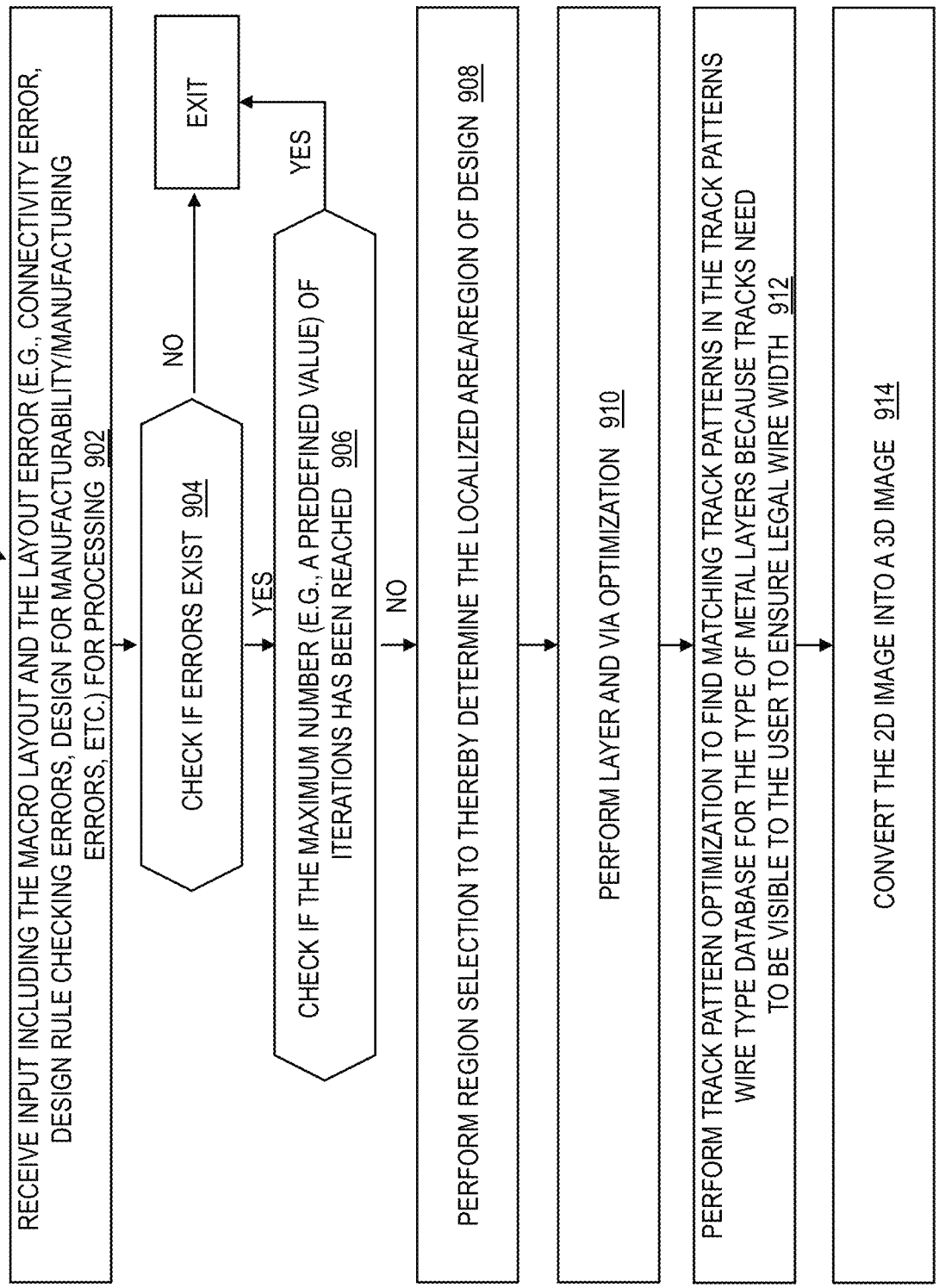

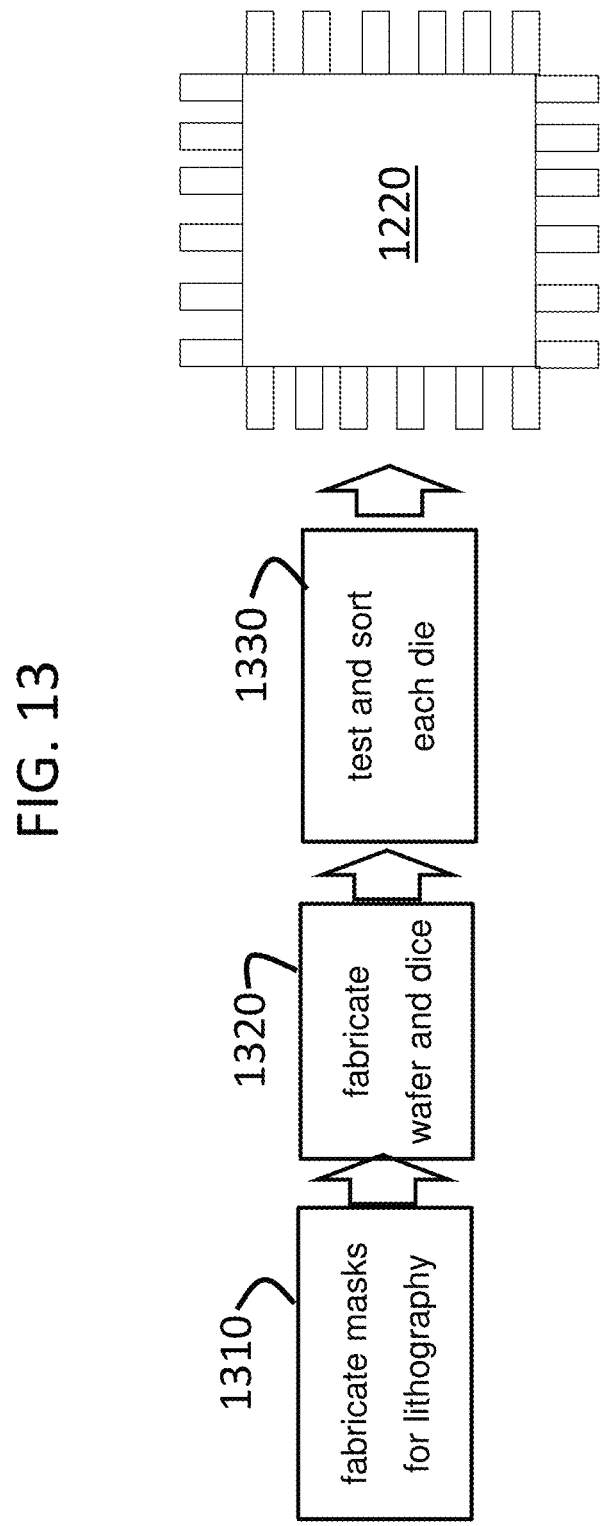

CONTEXT PROJECTION AND WIRE EDITING IN AUGMENTED MEDIA

BACKGROUND

The present invention generally relates to fabrication methods and resulting structures for integrated circuits, and more specifically, to fabrication methods and resulting structures configured and arranged for using design context projection and wire editing in augmented media.

Augmented reality is an enhanced version of the real physical world that is achieved through the use of digital visual elements, sound, or other sensory stimuli delivered via technology. It is a growing trend among companies involved in mobile computing and applications in particular.

SUMMARY

Embodiments of the present invention are directed to methods for using design context projection and wire editing in augmented media. A non-limiting example method includes responsive to receiving an indication of an error in a design for an integrated circuit (IC), extracting a localized area encompassing the error in the design and generating augmented reality media of the localized area of the design with a guide pattern, the localized area comprising objects. The method includes causing the augmented reality media of the localized area to be presented in a three-dimensional (3D) projection on an augmented reality device for a user and responsive to receiving at least one modification to the augmented media in the 3D projection, updating the design for the IC with at least one modification.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIGS. 5A and 5B depict a block diagram of mapping and editing the localized area/region of the design using an augmented reality device according to one or more embodiments of the present invention;

FIG. 6 depicts a block diagram illustrating further details of mapping the localized area/region of the design in real space using the augmented reality device according to one or more embodiments of the present invention;

FIG. 7 depicts a block diagram illustrating further details of editing the localized area/region of the design using the augmented reality device according to one or more embodiments of the present invention;

FIG. 8 is a flowchart of a process for selective three-dimensional (3D) data creation of the localized area/region to be augmented reality media for the IC according to one or more embodiments of the present invention;

FIGS. 9A and 9B depict a flowchart of a process for optimal region creation and selective 3D data creation of the localized region to be augmented reality media for the IC according to one or more embodiments of the present invention;

FIG. 13 is a process flow of a method of fabricating the IC of FIG. 12 in accordance with one or more embodiments of the present invention.

DETAILED DESCRIPTION

Figure 1:
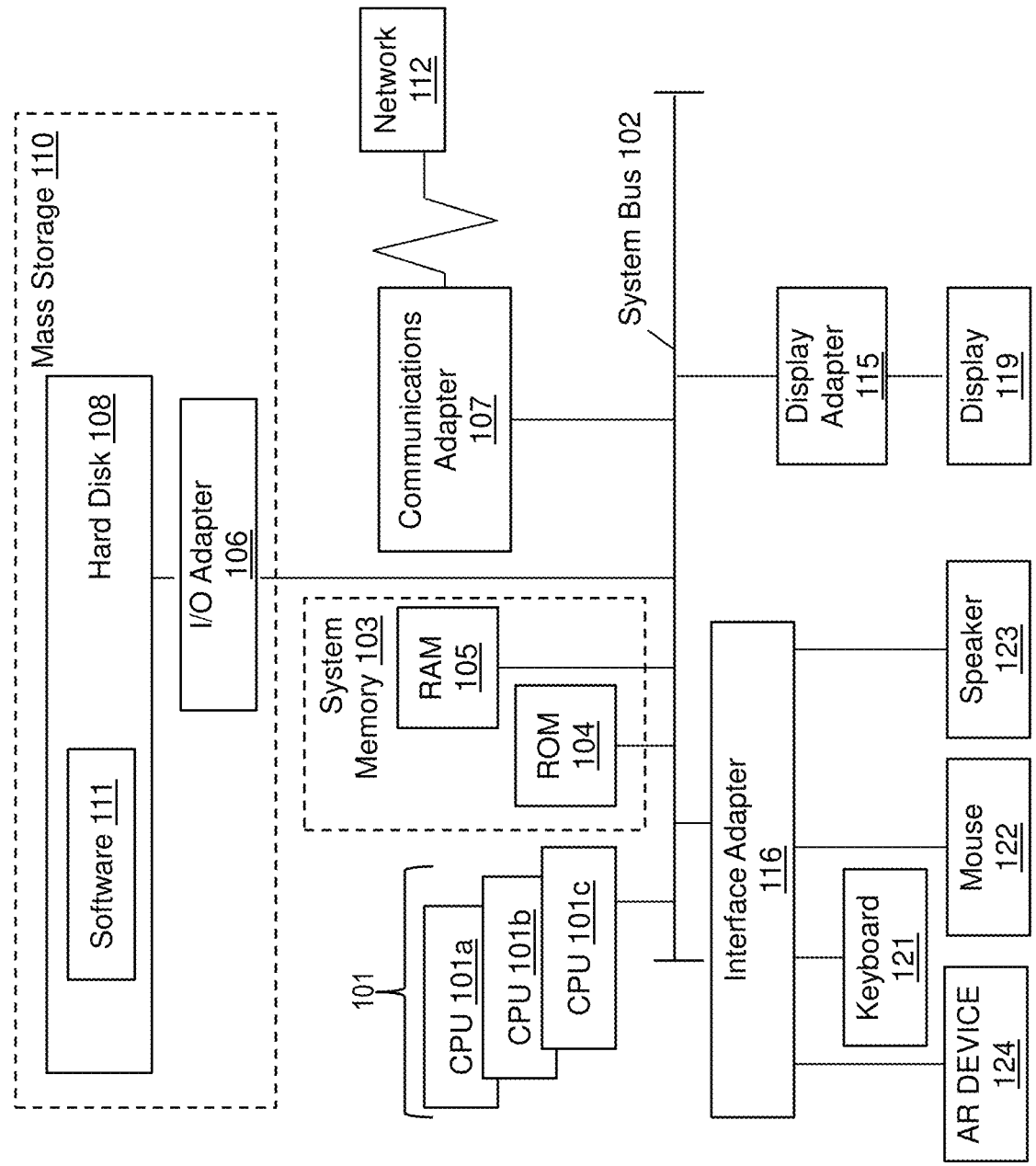
FIG. 1 depicts a block diagram of an example computer system for use in conjunction with one or more embodiments of the present invention.

One or more embodiments of the invention are configured to utilize design context projection and wire editing in augmented reality media, which is utilized to fabricate integrated circuits (ICs). One or more embodiments of the invention provide an augmented reality-based system where the manual routing for the IC can be performed with a minimal set of devices. Because hands are the best tools for a user to manipulate wires in a design, one or more embodiments are configured to remove the need for keyboard buttons or a mouse and to maximize the usage of hands in augmented media to corrects errors in the design of an IC. The user is free to draw and select the shapes for routing in order to resolve any design issues in the IC. The augmented media can also be shared among multiple users and each of them can edit and/or update the shapes of wires in the design for the IC. The wires are metal layers or nets, and providing a three-dimensional (3D) view of the metal layers affords added simplicity to route the nets in the IC according to one or more embodiments. One or more embodiments allow users to change a viewer perspective such that the design can be observed and edited from side perspectives too and not just the top angle/perspective.

For the sake of brevity, conventional techniques related to semiconductor device and IC fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

In the automated design of ICs, signoff (also written as "sign-off") checks is the collective name given to a series of verification steps that the design must pass before it can be taped out. This implies an iterative process involving incremental fixes across the board using one or more check types, and then retesting the design. Usually, there are two types of signoffs: front-end signoff and back-end signoff. After back-end signoff the chip goes to fabrication. After listing out all the features in the specification, the verification engineer will write coverage for those features to identify bugs and send back the design to the designer. Bugs or defects can include issues like missing features (comparing the layout to the specification), errors in design (typographical and functional errors), etc. When the coverage reaches a maximum percentage, then the verification team will sign it off. There are several categories of signoff checks. One example is design rule checking which is also known as geometric verification. Design rule checking involves verifying if the design can be reliably manufactured given current photolithography limitations. Design rule checking may include design for manufacturability/manufacturing rules, which describe the process of designing or engineering a product to facilitate the manufacturing process in order to reduce its manufacturing costs/issues.

Manual routing is part of the chip design flow to solve any design rule checking problem, net connectivity issues, and/or any other issues which cannot be solved using a routing tool or to avoid the unnecessary disruption using the tool. The manual routing may be performed using a routing tool such as an electronic design automation (EDA) tool for chip design flow as understood by one of ordinary skill in the art. A designer usually selects a net having design issues (such as design rule check issue, an open circuit, and/or a short circuit) and tries to route the net by drawing the shapes using mouse curser and keyboard functionalities with interactive buttons in the graphical user interface of the EDA tool. Manual routing using existing graphical user interface tools is not very intuitive and often requires experts with extensive knowledge in manual editing and routing. A new designer most of the time has to rely on an expert who can finish the job because the learning curve is so steep. The tools used in routing such as mouse curser and keyboard buttons can be cumbersome and often deliver a poor user experience. Additionally, a two-dimensional (2D) view of wires is often counter intuitive and difficult to understand when multiple metal layers are involved. This also makes debugging design issues difficult.

In accordance with one or more embodiments of the invention, augmented reality is utilized in the back-end chip design flow to provide intuitive experience to designers and ramp up their understanding quickly during their learning phase. By using design context projection and wire editing in augmented reality media, one or more embodiments of the invention provides a system configured to create a context by extracting a localized area/region around the problem region in the design, import the context and track pattern in the 3D augmented reality media for a set of routing layers, and selectively filter metal shapes to minimize the overall 3D data. The system is configured to enable editing, routing, and navigation of the editable shapes in the 3D augmented reality media and save the changes back in the design context. The system shares the 3D augmented reality design context in the augmented media with other users.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, augmented reality device 124, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
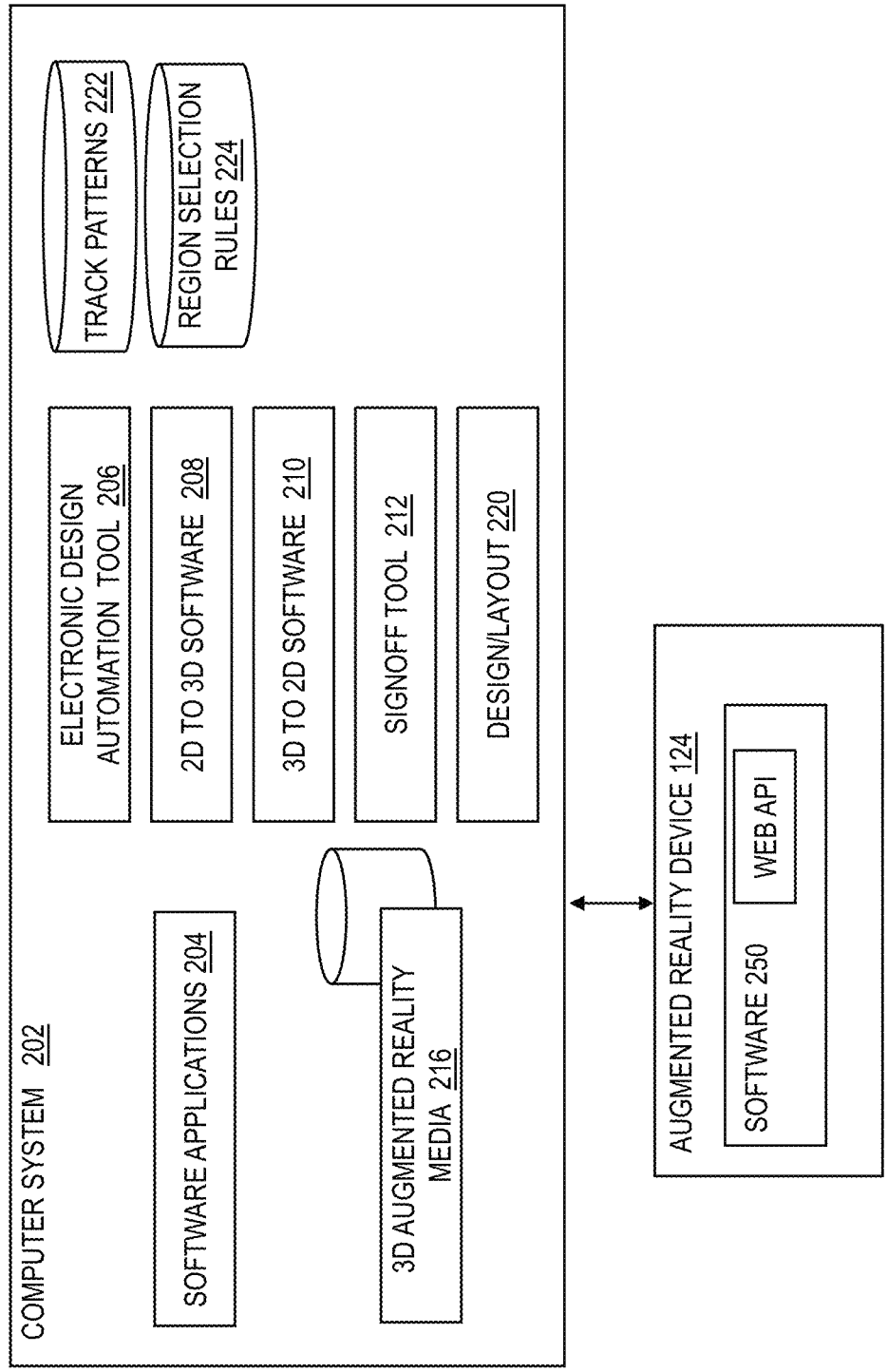
FIG. 2 depicts a block diagram of a system for using design context projection and wire editing in augmented media for an integrated circuit (IC) in accordance with one or more embodiments of the present invention.

FIG. 2 is a block diagram of a system 200 for using design context projection and wire editing in augmented reality media for an IC according to one or more embodiments of the invention. Elements of computer system 100 may be used in and/or integrated into computer system 202. In one or more embodiments, augmented reality device 124 may be coupled to computer system 100 over a network which could be wired and/or wireless. Although augmented reality device 124 is shown coupled to computer system 100 in FIG. 1 and coupled to computer system 202 in FIG. 2, augmented reality device 124 can include some, part of, and/or any portion of the hardware and software components discussed in computer systems 100, 202. Software applications 204 and software 250 may be implemented as and/or include software 111 executed on one or more processors 101, as discussed in FIG. 1. Software applications 204 can include, interface with, be coupled to, and/or call on an electronic design automation tool 206, two-dimensional (2D) to 3D software 208, 3D to 2D software 210, and signoff tool 212, in order to provide and/or modify objects in design 220 for an IC according to one or more embodiments of the invention.

In FIG. 2, computer system 202 may be coupled to augmented reality device 124, for example, by a wire and/or wirelessly over a network in order to communicate and transfer data. Augmented reality is an interactive experience of a real-world environment where the objects that reside in the real world are enhanced by computer-generated perceptual information, sometimes across multiple sensory modalities, including visual, auditory, haptic, somatosensory and olfactory. Augmented reality can be defined as a system that incorporates three basic features: a combination of real and virtual worlds, real-time interaction, and accurate 3D registration of virtual and real objects. The overlaid sensory information can be constructive (i.e., additive to the natural environment), and/or destructive (i.e., masking of the natural environment). This experience is seamlessly interwoven with the physical world such that it is perceived as an immersive aspect of the real environment. In this way, augmented reality alters the user's ongoing perception of a real-world environment. In general, augmented reality includes registration and tracking between the superimposed perceptions, sensations, information, data, and images and some portion of the real world. Augmented reality device 124 can include and be representative of various types of devices configured to provide augmented reality. Although some examples of hardware and software components that may be utilized for augmented reality device 124 are discussed below, the types of augmented reality devices are not meant to be limited. Augmented reality device 124 can include any combination of the hardware and software capabilities discussed below.

Hardware components for augmented reality device 124 can include processors, a display, sensors (including cameras) for tracking movements and gestures made by the user's hands/fingers, and input devices. Modern mobile computing devices like smartphones and tablet computers contain these elements, which often include a camera and microelectromechanical systems (MEMS) sensors such as an accelerometer, a global positioning system (GPS), and a solid state compass, making them suitable augmented reality platforms. For display, various technologies may be used in augmented reality rendering, including optical projection systems, monitors, handheld devices, and display systems, which are worn on the human body.

A head-mounted display (HMD) is a display device worn on the forehead, such as a harness or helmet-mounted. HMDs place images of both the physical world and virtual objects over the user's field of view. Modern HMDs often employ sensors for six degrees of freedom monitoring that allow the system to align virtual information to the physical world and adjust accordingly with the user's head movements. HMDs and/or other augmented reality devices include gesture controls for full virtual immersion. In some cases, augmented reality devices can have displays rendered on devices resembling eyeglasses. Versions include eyewear that employ cameras to intercept the real world view and re-display its augmented view through the eyepieces, in which the augmented reality imagery is projected through or reflected off the surfaces of the eyewear lens pieces. In some cases, augmented reality devices can include a head-up display (HUD) which is a transparent display that presents data without requiring users to look away from their usual viewpoints. Near-eye augmented reality devices can be used as portable head-up displays as they can show data, information, and images while the user views the real world.

Augmented reality devices may include a handheld display that employs a small display that fits in a user's hand. Handheld augmented reality solutions may use video see-through. Handheld augmented reality devices may employ fiducial markers, GPS units, and MEMS sensors such as digital compasses and six degrees of freedom accelerometer (gyroscope). Simultaneous localization and mapping (SLAM) markerless trackers such as PTAM (parallel tracking and mapping) can also be used. Handheld augmented reality devices have the benefit of portable and ubiquitous because of camera (mobile) phones.

Figure 3:
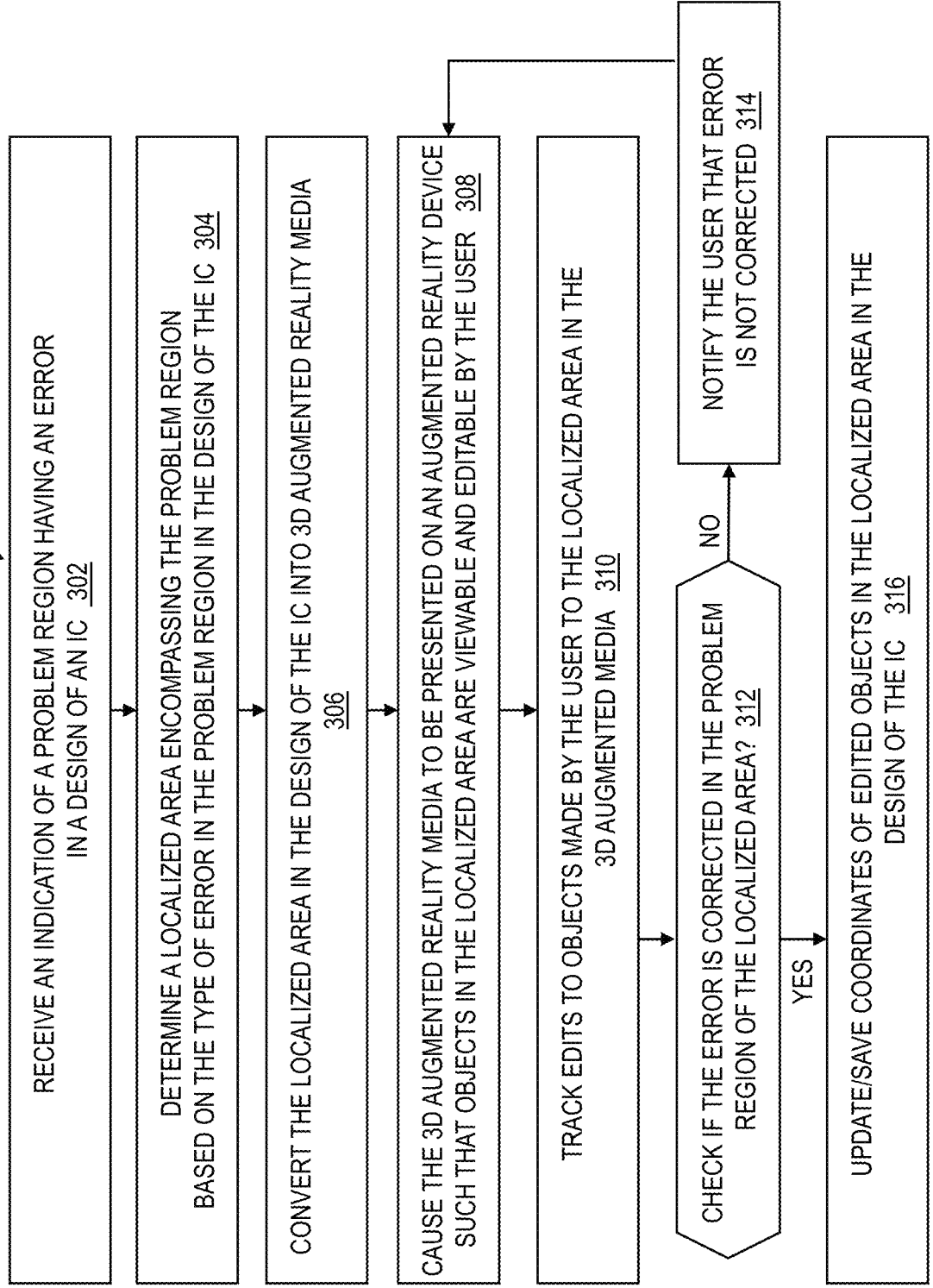
FIG. 3 is a flowchart of a process for using design context projection and wire editing in augmented media for the IC, resulting in the fabrication of a semiconductor structure according to one or more embodiments of the present invention.
Figure 4:
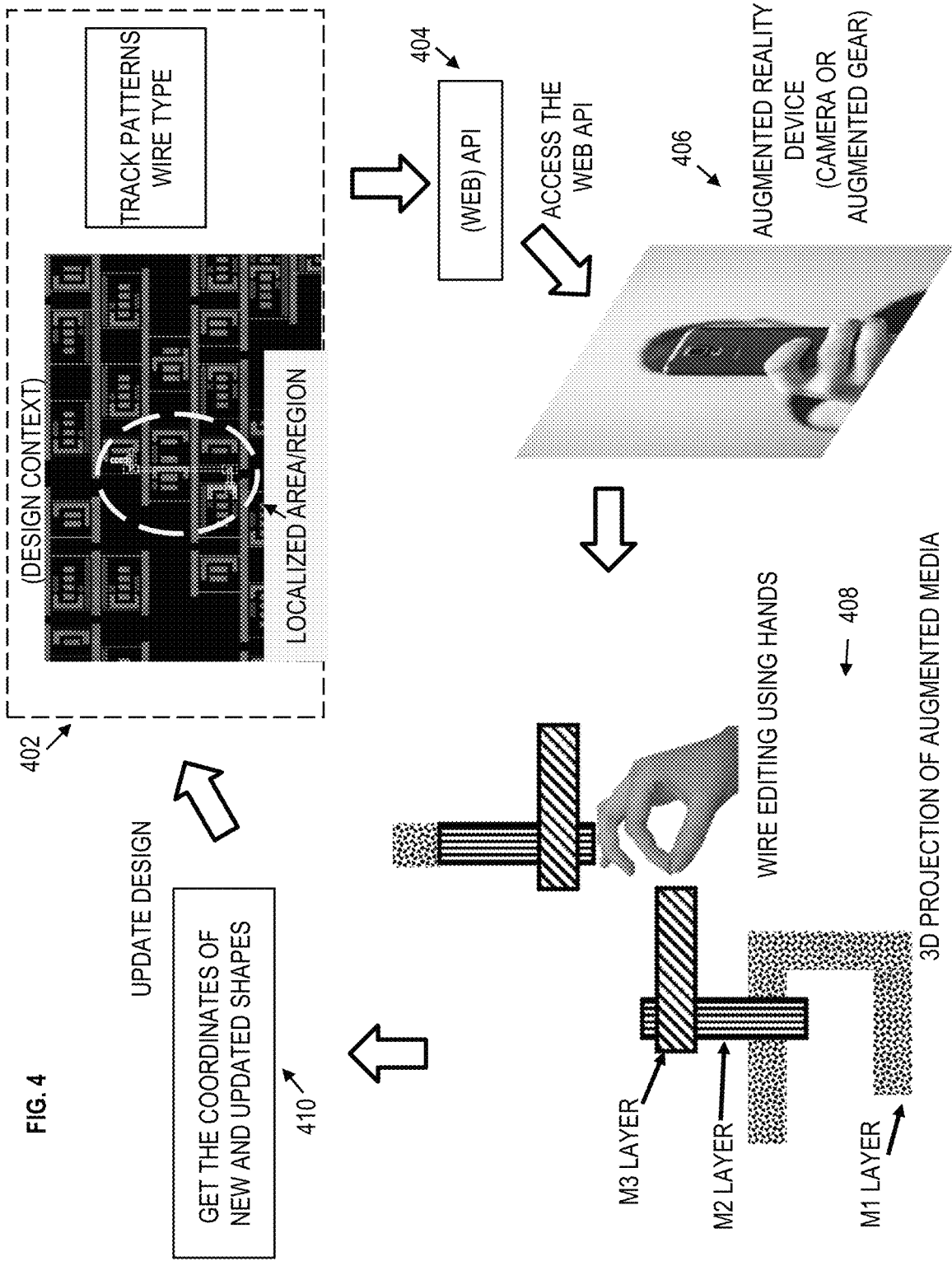
FIG. 4 depicts a block diagram of using design context projection and wire editing in augmented media for the IC according to one or more embodiments of the present invention.

FIG. 3 is a flowchart of a process 300 for using design context projection and wire editing in augmented reality media for an IC, resulting in the fabrication of a semiconductor structure according to one or more embodiments of the invention. FIG. 4 depicts a block diagram of using design context projection and wire editing in augmented reality media for the IC according to one or more embodiments of the invention. The process 300 may be described with reference to FIGS. 2 and 4.

At block 302 of the process 300, software applications 204 are configured to receive an indication of a problem region having an error in a design 220 of an IC. Signoff tool 212 is configured to run various checks on design 220 of the IC. Upon detecting an error, such as an error that requires manual routing of wires or nets, in a portion of design 220, software applications 204 can receive the location of the problem region having the error in the design 220 from signoff tool 212. A netlist is a description of the connectivity (wires/nets) of an electronic circuit. In general, a netlist includes a list of the electronic components in a circuit and a list of the nodes they are connected to. As noted above, signoff tool 212 performs checks which are a series of verification steps that the design must pass before it can be taped out. The checklist can include design rule checking. The wires/nets are metal layers (sometimes called traces) that connect nodes/pins in design 220.

At block 304, software applications 204 are configured to determine a localized area encompassing the problem region having the error, and the size of the localized area is based on the type of error in the problem region of design 220 for the IC. There can be various routing errors. The localized area is selected to include the objects, such as metal layers and metal vias (or just vias), in design 220 of the IC that are causing and/or related to the error. Wires, nets, and metal layers (i.e., objects) may be utilized interchangeably to represent physical connections in design 220. Software applications 204 may filter out objects that are not related to the error such that there is less data required to be converted from a 2D format to a 3D format. An example localized area/region is depicted in view 402 of FIG. 4. Various types of metal layers will be discussed herein, such as M1 metal layer, M2 metal layer, M3 metal layer, and so forth. In some designs, there can be 15 or more metal layers, where the M2 metal layer is over the M1 metal layer, the M3 metal layer is over the M2 metal layer, and so forth. Software applications 204 are configured to select the track pattern according to the wire type causing the error, so that the track pattern can be superimposed on the localized area for the user. Software applications 204 can search, for example, track patterns wire type database 222 which contains the track pattern for each type of metal layer (e.g., M1, M2, M3, etc.).

At block 306, software applications 204 are configured to convert and/or cause the localized area/region of design 220 of the IC to be converted into 3D augmented reality media 216 by converting the localized region from a 2D format to a 3D format. The 3D augmented reality media 216 is the image that will be projected on and/or displayed over the real-world view (or real-world environment) on the display of the augmented reality device 124, such that the user can view and manipulate the 3D augmented reality media 216 by hand gestures. For example, the 3D augmented reality media is superimposed on the real-world environment for viewing on the display screen the augmented reality device 124. Software applications 204 may employ any 2D to 3D conversion software such as, for example, 2D to 3D software 208. Each of the objects in the localized area/region have 2 dimensions in a coordinate system having X and Y axes, and the software applications 204 can assign each object a thickness in the Z axis. Software applications 204 and/or 2D to 3D software 208 can assign a nominal thickness to the objects based on their wire type (M1, M2, M3, etc.). In some cases, each metal layer can have a thickness in the Z axis of predefined amount. Any known technique for converting a 2D image/model to a 3D image/model may be utilized as understood by one of ordinary skill in the art. Software applications 204 can call on and/or employ any augmented reality software development kits (SDKs) to format the 3D augmented reality media 216 to match the operating system of the desired augmented reality device. In some cases, the 3D image/model can be scaled up for a better view; for example, the coordinates can be scaled up. One of ordinary skill in the art understands various methods for using augmented reality SDKs.

At block 308, software applications 204 are configured to cause the 3D augmented reality media 216 to be presented on the augmented reality device 124 such that the objects (e.g., metal layer, vias, spaces, etc.) in the localized area are viewable and editable by the user of augmented reality device 124. Software applications 204 can store 3D augmented reality media 216 and/or permit access to augmented reality media 216 by augmented reality device 124. In one or more embodiments, augmented reality device 124 can utilize a web application programming interface (API) to access augmented reality media 216. In one or more embodiments, software applications 204 can send 3D augmented reality media 216 to augmented reality device 124 and cause it to be displayed thereon. View 404 in FIG. 4 illustrates use of an API to access augmented reality media 216 from computer system 202, for example. The web API could be downloaded on the augmented reality device 124 to cause augmented reality device 124 device to function as discussed herein. View 406 in FIG. 4 illustrates an example of augmented reality device 124 (e.g., a mobile phone and/or any augmented reality gear) displaying 3D augmented reality media 216 in view 408.

At block 310, augmented reality device 124 is configured to track edits made by the user's hands to the localized area/region in the 3D augmented reality media 216 using the camera and/or any other sensors on augmented reality device 124. As the display of augmented reality device 124 shows the 3D augmented reality media 216 to the user, view 408 illustrates the user's hands editing the wires in FIG. 4. In view 408, the display of augmented reality device 124 shows the M1 metal layers, M2 metal layers, and M3 metal layers and the user's hand gestures manipulating the objects. As the augmented reality device 124 (which is, for example, illustrated as a mobile phone with a camera capturing the finger movements of the user relative to the coordinates of the metal layers) tracks hand gestures that edit the objects in the localized area, updates to objects in the localized area/region are received by software applications 204 from augmented reality device 124. For example, software applications 204 can receive coordinates of new and updated objects (shapes) at view 410 in FIG. 4. In some cases, software 250 of augmented reality device 124 may store the updates and then send them all the updated file to software applications 204. In some cases, software 250 may send the updates made by the user to software applications 204 as the updates are simultaneously being made to the objects.

At block 312, in response to receiving from augmented reality device 124 modifications to objects in localized area/region made by the user using the user's fingers/gestures to change the objects (e.g., one of the metal layers), software applications 204 are configured to check if the error is corrected in the problem region of the localized area of design 220 for the IC. For example, software applications 204 are configured to convert and/or employ 3D to 2D software 210 to convert the modified 3D augmented reality media 216 (having the updates) back to a 2D image/model. Software applications 204 can replace previous objects in the localized area/region in design 220 and/or integrate the updated objects into the localized area/region of design 220. Software applications 204 are configured to cause signoff tool 212 and/or send updated design 220 back to the signoff tool 212 to recheck design 220, thereby checking whether the problem region having the error has been corrected in design 220.

At block 314, if (NO) the error is not corrected, software applications 204 are configured to notify the user that the error is not corrected, and flow proceeds to block 308. Software applications 204 can cause a visual notification (e.g., text, picture, symbol, icon, etc., on the display of augmented reality devices 124), audible notification (via speakers), haptic notification, and/or any combination of the same on augmented reality device 124 such that the user is alerted that the edits did not fix the error.

At block 316, if (YES) the error is corrected, software applications 204 are configured to update and save the coordinates of the edited objects in the localized area in design 220 of the IC. Software applications 204 are configured to send the corrected design 220 to a fabrication plant and/or foundry for fabrication of the IC, as discussed in FIGS. 14 and 15.

Figure 5A:
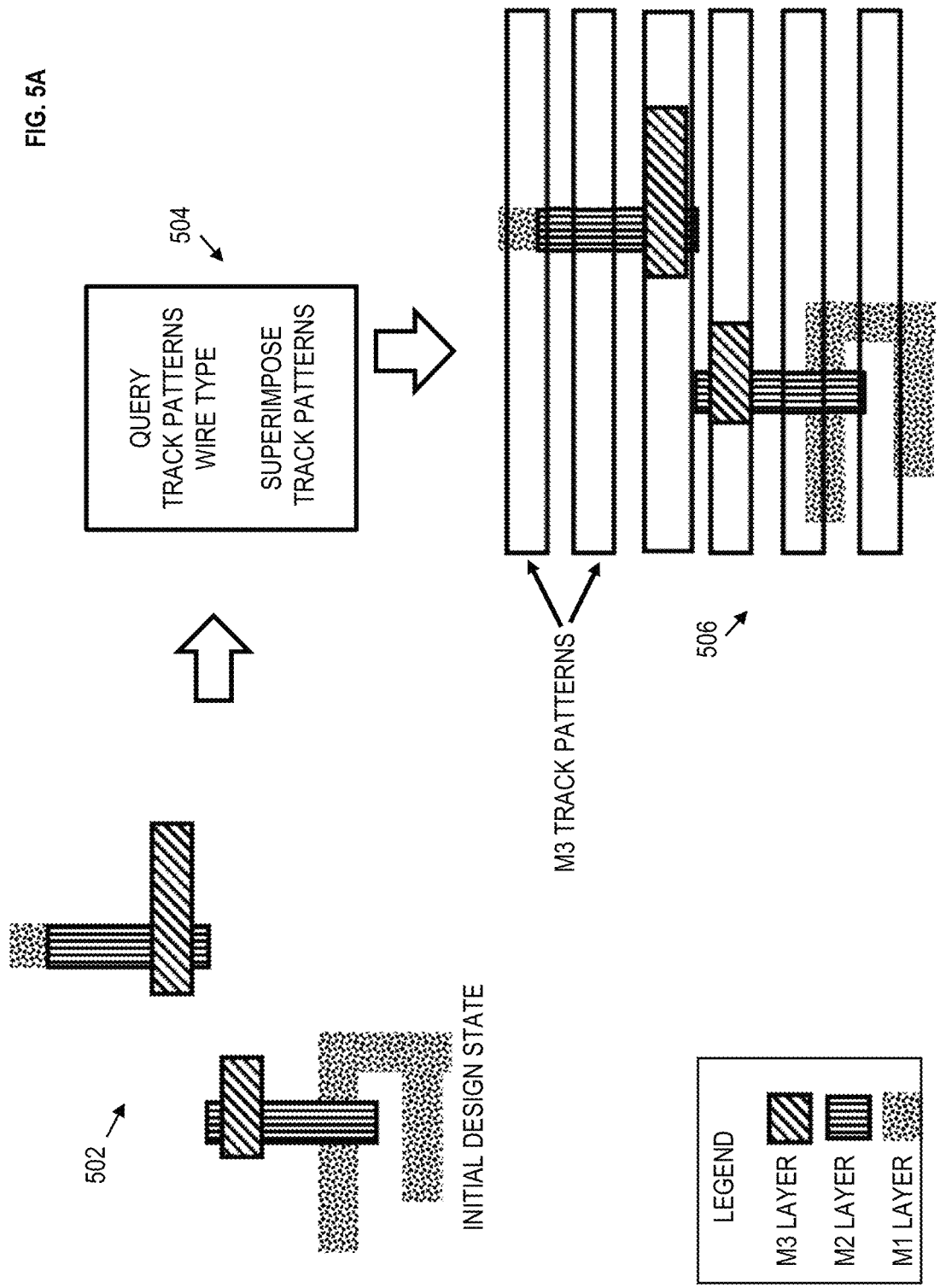

FIGS. 5A and 5B depict a block diagram of mapping and editing the localized area/region of design 220 using augmented reality device 124 according to one or more embodiments. According to the type of error in design 220, view 502 illustrates the initial design state of the localized area as extracted from design 220 by software applications 204. Software applications 204 are configured to query the track patterns wire type database 222 according to the wire type(s) (and/or type of metal layers such as M1, M2, M3) in the localized area and superimpose the track patterns on the initial design state of the localized area for the 3D augmented reality media 216 as illustrated in views 504, 506. For ease of illustration and so as not to obscure the figure, view 506 illustrates the track patterns for the M3 metal layers but it should be appreciated that track patterns for the other metal layers are present. The track patterns are utilized as visual guides (like grid lines or a ruler) when the user edits the objects (i.e., metal layers) using the augmented reality device 124, although the track patterns are not present in the actual design. After software applications 204 have sent/provided the 3D augmented reality media 216 to augmented reality device 124, this causes/instructs augmented reality device 124 to display augmented reality media 216 to the user on the display of augmented reality device 124.

In FIG. 5B, view 508 illustrates routing of M2 metal layers and M3 metal layers using the hand of the user. If the mobile phone is the augmented reality device 124, the user places its hand in front of the camera such that the camera can track and display on the display screen the gestures being made to the objects in the localized area. During mapping of augmented reality media 216, software 250 of augmented reality device 124 is configured to create a reference point (e.g., origin) and map the localized area of design 220 (of augmented reality media 216) in a real space, where every point of the localized area has a 3D coordinate. Software 250 of augmented reality device 124 is configured to use the bottom left of the mobile camera projection as the initial reference. Software 250 is configured to present the augmented reality media 216 of the localized area is view mode or edit mode for the user. In view mode, a simple finger trace can be used to change the viewer perspective and angles of the 3D image of the localized area displayed on the display screen of augmented reality device 124. As an example, the users may utilize their thumb, forefinger (or pointer finger), and middle finger in a pinching gesture to change the viewer perspective and/or angles of the 3D image. In edit mode, users may utilize their thumb to delete the wires and forefinger to redraw (or extend) the wires. For example, the user can view the display screen of a mobile phone, while extending the user's hand in front of the forward facing camera such that the user's hand is captured by the camera and displayed on the display screen of the mobile phone along with display of augmented reality media 216. As seen on the display screen of the augmented reality device 124 (e.g., mobile phone) in view 508 of FIG. 5B, the user has extended M3 metal layer 552 and extended M2 metal layer 550 of the localized area. Software 250 is configured to store a relationship between the original and the changed reference of the localized area of the design because the design is editable from any angle. Because the reference modifies by a factor $\alpha$, the coordinates stored for each point also change. Moreover, the factor $\alpha$ is dependent on the scaling factor and the orientation (e.g., top, side, etc.) of the view.

After software 250 has mapped the changes and stored the changes to the localized area of the design for the augmented reality media 216, software 250 passes the changes and/or changed localized area of the design back to software applications 204. As noted above, software 250 may continuously pass the changes to the localized area as the user is making updates to the augmented reality media 216. View 510 illustrates that software applications 204 are configured to save the updated localized area (e.g., the design context) of design 220 and run another check (e.g., via signoff tool 212). Software applications 204 can convert the 3D augmented reality media to a 2D image and integrate the updated localized area back into the larger design 220. If software applications 204 receive a signoff indication from the signoff tool 212 indicating the updated design 220 passed the design rule checking, then the updated design 220 is saved such that the IC is ready for fabrication. If the signoff tool 212 finds an error after performing the design check, software applications 204 are configured to send the localized area of 3D augmented reality media 216 back to augmented reality device 124 with a failure notification. View 512 illustrates fixing the design rule checking error by the user extending the M3 metal layer 552 in a subsequent iteration, and software applications 204 can save these updates as the final state of the design 220 for IC fabrication.

FIG. 6 depicts a block diagram illustrating further details of mapping the localized area/region of design 220 in real space using augmented reality device 124 according to one or more embodiments. View 602 represents the 3D image of the localized area displayed on the display screen of the augmented reality device 124 in which a top view projection is shown. In the top view projection of view 602, a pinching motion of the user's hand is tracked by the camera (or other sensors) of the augmented reality device 124 to change the perspective. In the side view projection of view 604, a motion to rotate fingers of the user can be tracked by the camera (or other sensors) of the augmented reality device 124 to change the side view angle. In FIG. 6, $O_{REF}$ is the reference point in the top view projection depicted in view 602, while $O'_{REF}$ is the reference point in the side view projection depicted in view 604. The reference point is the coordinates of the lowest point (e.g., at the far left) of the localized area in view 402. There is a relationship where $O'_{REF} = \alpha \cdot O_{REF}$, where a is a factor and/or the amount that the user is changing the perspective. As the viewing angle changes, so does the reference point by a factor α proportional to the rotation and translation of the fingers.

As an example scenario, a camera or augmented gear (i.e., augmented reality device 124) is used to project a subset of the design in real space. The design is casted in top view mode and appears as a 2D model. The rectangular shapes denote wires in multiple metal layers. For a design with a high wire density, the top view may be insufficient to depict the actual net connectivity. By using the thumb and forefinger in a pinching gesture, the user can move up and down to change the perspective and can then view the design from a side view. In the side view mode, the user can laterally rotate their hands and change the viewing angle. The viewing angle changes according to the rotation and translation of the fingers.

FIG. 7 depicts a block diagram illustrating further details of editing the localized area/region of design 220 using augmented reality device 124 according to one or more embodiments. An example scenario is provided to reroute a wire/net/metal layer connection. According to the error in design 220, view 702 illustrates the initial design state of the localized area as extracted from design 220 for display on the display screen of augmented reality device 124. For ease of illustration and so as not to obscure the figure, the superimposed track patterns are not shown for the metal layers but it should be appreciated that track patterns are displayed for the user.

As seen in view 702, the user can use the thumb to hover over an object 750 (e.g., an M2 metal layer) and software 250 is configured to interpret this hand gesture as a call for deletion of the segment, i.e., deletion of object 702 as depicted in views 702, 704. The user can utilize the forefinger to hover over each of the desired horizontal segments (e.g., objects 752, 754) and move the finger in a sliding motion to denote the extension of the wire in the same track as depicted by horizontal arrows 760, 762 pointing to the left in view 706. Additionally, view 706 shows the user utilizing the finger in a vertical plane motion (e.g., up or down) to create a connection between two horizontal layers (e.g., objects 752, 754) according to vertical arrow 764. The results of the gestures that have been implemented by software 250 are shown in view 708, which is displayed on the display screen of augmented reality device 124. It should be appreciated that the desired object can be modified, extended, removed, and/or changed as the user is making the gestures (i.e., simultaneously and/or nearly simultaneously), and views 706, 708 are shown separately for ease of understanding and so as not to obscure the figure. Moreover, the final design state of the localized area in 3D augmented reality media 216 shows extended objects 752, 754 and new connecting object 756 according to the hand gestures shown in view 706. Software 250 is configured to determine that only one metal layer can be used to connect the two horizontal shapes. Accordingly, the user has created a rerouted net with the object 756 moved to another track. Software 250 may include and/or be coupled to tracking software that is configured to capture, determine, and execute hand gestures as understood by one of ordinary skill in the art. In some case, the user may wear gloves with fiducial markers that are recognizable by software 250, which enhances the accuracy of the tracking.

FIG. 8 is a flowchart of a process 800 for selective 3D data creation of the localized area/region to be augmented reality media for the IC according to one or more embodiments of the invention. The conversion of 2D data for the design into 3D data is part of the process to generate 3D augmented reality media 216. All data in design 220 is provided in terms of polygon shapes, which can be simplified using a set of rectangles. Because creation of 3D data for the entire design 220 is very computationally intensive (e.g., using excessive processors, RAM, times, etc.), software applications 204 are configured to determine and create 3D data for selective objects which is a technical benefit according to one or more embodiments, thereby reducing the resources used by a computer. The 2D data can be fetched in the form of a URL from a website. Software applications 204 are configured to create 3D data for wires and vias as discussed further below.

At block 802, software applications 204 are configured to define the localized area/region in design 220 for which 3D data needs to be created. At block 804, software applications 204 are configured to define the objects within the localized area/region according to the application, the window, and objects. For example, it may be supposed that the application is about debugging and there is a violation such as, for example, one or more design rule checking violations, open circuit violations, short circuit violations, etc. Based on the violation type (i.e., type of error), software applications 204 are configured to define the region to encompass the error. For example, a spacing error has a different localized region than that of an open circuit violation; accordingly, the objects inside the region correspondingly vary based on the violation type. To form the window, rectangular coordinates such as, for example, Xlow, Ylow, Xhigh, Yhigh are given by the user, and all objects with errors are fetched.

At block 806, software applications 204 are configured to create an output file which contains coordinates of rectangle shapes that are related to the specific type of violation that has occurred. In one or more embodiments, the output file can be in a Java® Script Objection Notation (JSON) format as follows:

```
*****
Layer: M2
Data:{[1, 2.1, 1.2, 5],
  [5.0, 3, 5.2, 8],
  [2., 2, 2.2, 4]}
}
Layer: M3
...
...
*****
```

In the brackets "[ ]" above, each pair of brackets denotes the shape of an object (i.e., is a metal layer, via, etc.) having X and Y coordinates, where the bracket has the format [Xlow, Ylow, Xhigh, Yhigh] such that each X value is paired with each Y value, thereby forming example X, Y pairs (1, 2.1), (1, 5), (1.2, 2.1), (1.2, 5) for a single (rectangular) M2 metal layer.

At block 808, software applications 204 are configured to convert the objects into 3D data (or 3D objects). Software applications 204 can add a nominal thickness as a Z component for each of the X, Y coordinate pairs. Software applications 204 may call on and/or instruct 2D to 3D software 210 to perform the conversion. At block 810, software applications 204 are configured to create a uniform resource locator (URL) linked to the 3D augmented reality media 216, which can be served and/or sent to augmented reality device 124, thereby causing augmented reality device 124 to display the 3D augmented reality media 216 and to track edits to objects made by the user.

Figure 9B:
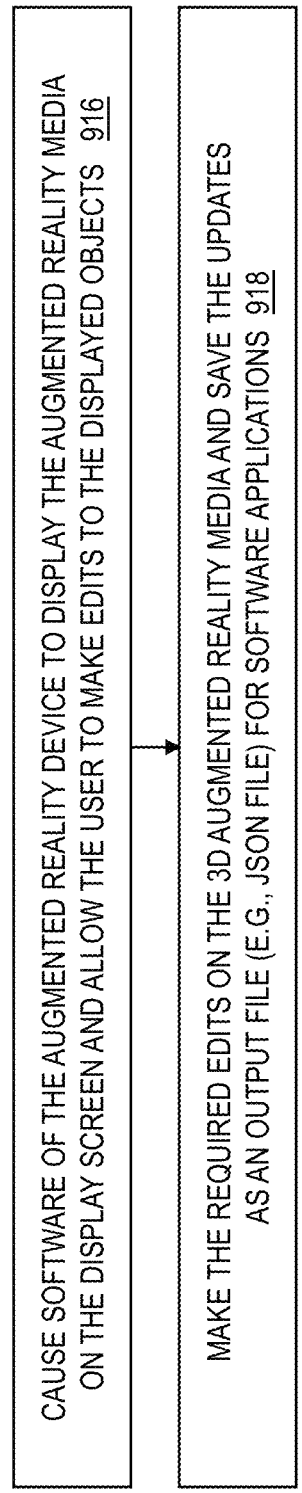

FIGS. 9A and 9B depict a flowchart of a process 900 for optimal region creation and selective 3D data creation of the localized region to be augmented reality media for the IC according to one or more embodiments of the invention. At block 902 of the process 900, software applications 204 are configured to receive input. The input may include the macro layout (e.g., design 220) and the layout error (e.g., connectivity error, design rule checking errors, design for manufacturability/manufacturing errors, etc.) for processing.

At block 904, software applications 204 are configured to check if an error exist in design 220. If there are no errors, the flow ends. If there are errors in design 220, software applications 204 are configured to check if the maximum number (e.g., a predefined value) of iterations has been reached for using augmented reality to correct the error at block 906. If the maximum number has been reached, the flow ends.

At block 908, if the maximum number has not been reached, software applications 204 are configured to perform region selection to thereby determine the localized area/region of design 220. Software applications 204 can access and read region selection rules 224 which provide a collection of rules to be utilized for selecting a localized area/region of the design 220 according to various types of errors. In region selection rules 224, selection of the region is dependent on the use case such as the type of error. As an example for open circuits, software applications 204 are configured to select the area enclosing the source and sink pin of the open (i.e., open circuit), where (Xlow, Ylow)=min [(xlow of source, ylow of source), (xlow of sink, ylow of sink), and (Xhigh, Yhigh)=max[(xhigh of source, yhigh of source), (xhigh of sink, yhigh of sink). In other words, software applications 204 are configured to obtain the coordinates of the sink and source, such as two metal layers that should be electrically and physically connected but are instead experiencing an open circuit violation. As an example for design rule checking violations, software applications 204 are configured to keep the design rule checking violation in the center of the localized area/region and capture an area required to fix the design rule checking violation. FIGS. 10A, 10B, 10C, and 10D depict example scenarios for region selection as discussed further herein.

At block 910, software applications 204 are configured to perform layer and via optimization. The layers and/or vias which are to be edited are highlighted in the localized area/region such that the layers and/or vias have a distinctive visual quality for the user to see. As an example for open circuits, software applications 204 are configured to select layers based on the availability of the empty tracks in the region of opens. This ensures that there is an available space for the two metal layers to be connected by the user of the augmented reality device.

As an example for design rule checking violations, for spacing/area violation, software applications 204 are configured to highlight the layer in which the error exists, and both vias pertaining to that layer. For a via-to-via violation such as a VIAx to VIAx violation, software applications 204 are configured to highlight both the layers to which VIAx is connected to and the vias associated with the two layers. For example, for the VIAx to VIAx violation, if VIAx is V3, then V3 connects M3 metal layer (M3) and M4 metal layer (M4). The V3 to V3 spacing violation needs a view of both the M3 and M4 layers as well as all neighboring V3s. For VIAx to VIAy violations, software applications 204 are configured to highlight all the three layers which are connected through these vias and the associated vias. For VIAx to VIAy violations, if VIAy is V4, then V4 connects M4 metal layer (M4) and M5 metal layer (M5). For a V3 to V4 spacing violation, software applications 204 provide the view of the M3, M4, and M5 metal layers and neighboring V3 and V4 vias.

At block 912, software applications 204 are configured to perform track pattern optimization to find the matching track patterns in the track patterns wire type database 222 for the type of metal layers because tracks need to be visible to the user to ensure legal wire width while editing with the augmented reality device. As an example for open circuits, software applications 204 are configured to highlight, after the layers are selected for the localized area/region, track patterns for the same layers. As an example for design rule checking violation, for spacing/area violations, software applications 204 are configured to highlight the track pattern of the faulty layer. As an example for design rule checking violations, for via-to-via violations, software applications 204 are configured to highlight the track pattern of the affected layers.

At block 914, software applications 204 are configured to convert the 2D image into a 3D image. The 2D image may be converted into an output file (e.g., JSON file), which is then converted into the 3D image of the 3D augmented reality media 216. At block 916, software applications 204 are configured to cause software 250 of the augmented reality device 124 to display the augmented reality media 216 on the display screen and allow the user to make edits to the displayed objects. At block 918, software 250 is configured to make the required edits on the 3D augmented reality media 216 and save the updates as an output file (e.g., JSON file) for software applications 204. Flow proceeds back to block 902.

Figure 10A:
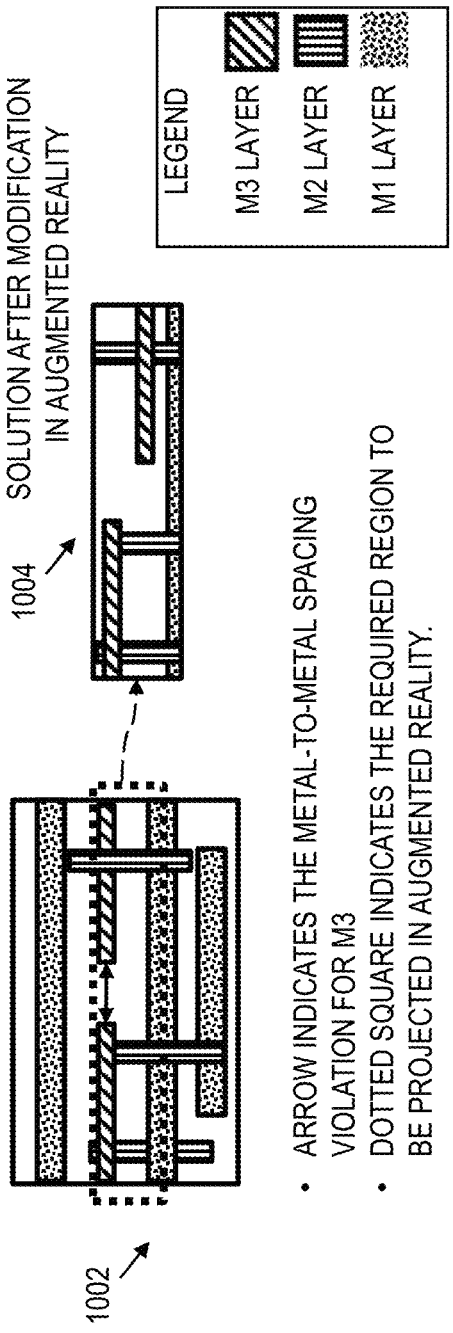
FIGS. 10A, 10B, 10C, and 10D depict block diagrams of example scenarios for localized area/region selection according to one or more embodiments of the present invention.

FIGS. 10A, 10B, 10C, and 10D depict block diagrams of example scenarios for localized area/region selection according to one or more embodiments. In FIG. 10A, view 1002 illustrates a minimum space design rule checking violation in design 220 in which the arrow indicates the metal-to-metal spacing for the M3 metal layer. The dotted square box indicates the required region (e.g., localized region) to be projected in augmented reality on the display of the augmented reality device 124, according to the type of error as determined by software applications 204. View 1004 illustrates the solution after modification in augmented reality using augmented reality device 124.

Figure 10B:
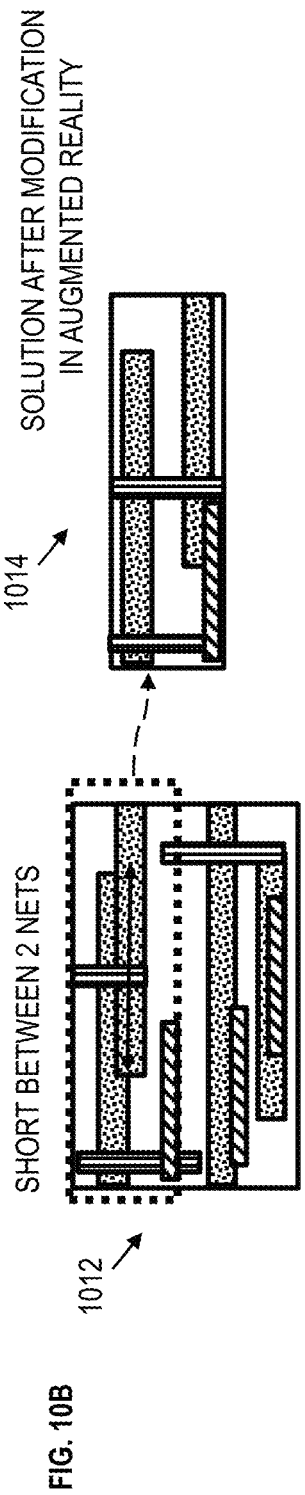

In FIG. 10B, view 1012 illustrates a short circuit between two metal layers (e.g., two nets) in design 220 in which the arrow indicates the short. The dotted square box indicates the required region (e.g., localized region) to be projected in augmented reality on the display of the augmented reality device 124, according to the type of error as determined by software applications 204. View 1014 illustrates the solution after modification in augmented reality using augmented reality device 124.

Figure 10C:
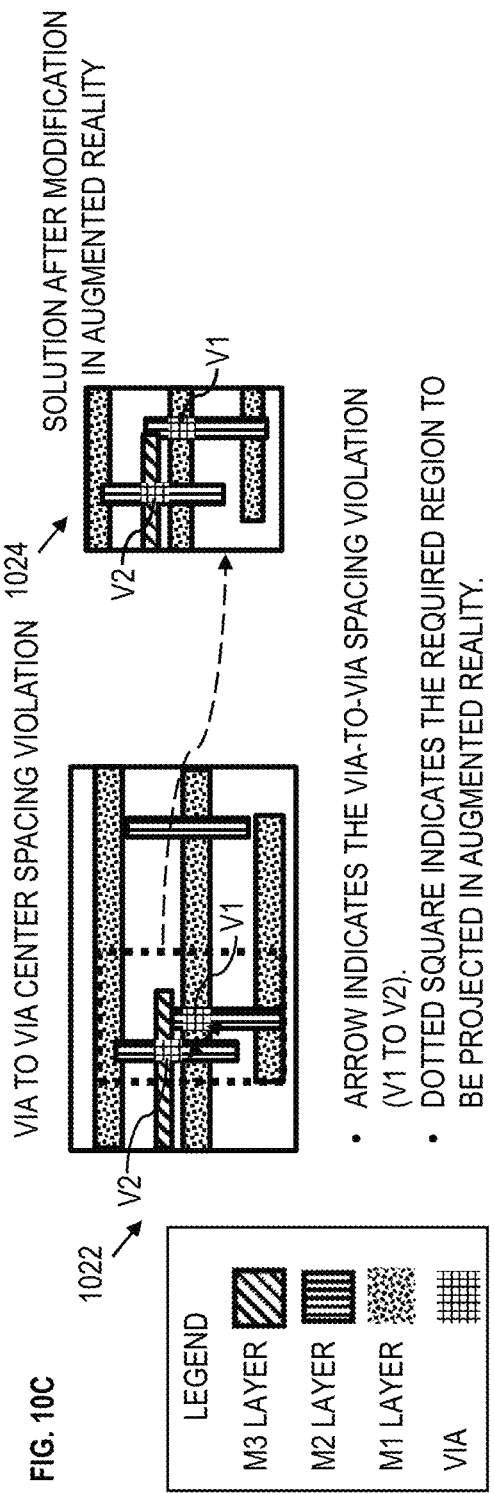

In FIG. 10C, view 1022 illustrates a metal via to metal via center spacing violation in design 220 in which the arrow indicates the via-to-via spacing violation. The dotted square box indicates the required region (e.g., localized region) to be projected in augmented reality on the display of the augmented reality device 124, according to the type of error as determined by software applications 204. View 1024 illustrates the solution after modification in augmented reality using augmented reality device 124.

Figure 10D:
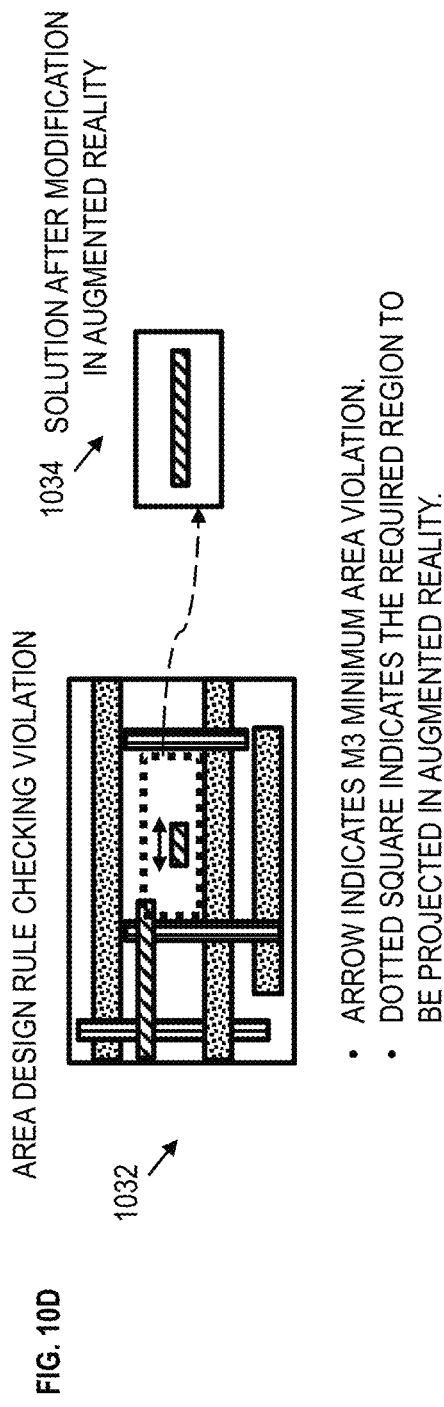

In FIG. 10D, view 1032 illustrates an area design rule checking violation in design 220 in which the arrow indicates an M3 minimum area violation. The dotted square box indicates the required region (e.g., localized region) to be projected in augmented reality on the display of the augmented reality device 124, according to the type of error as determined by software applications 204. View 1034 illustrates the solution after modification in augmented reality using augmented reality device 124.

Figure 11:
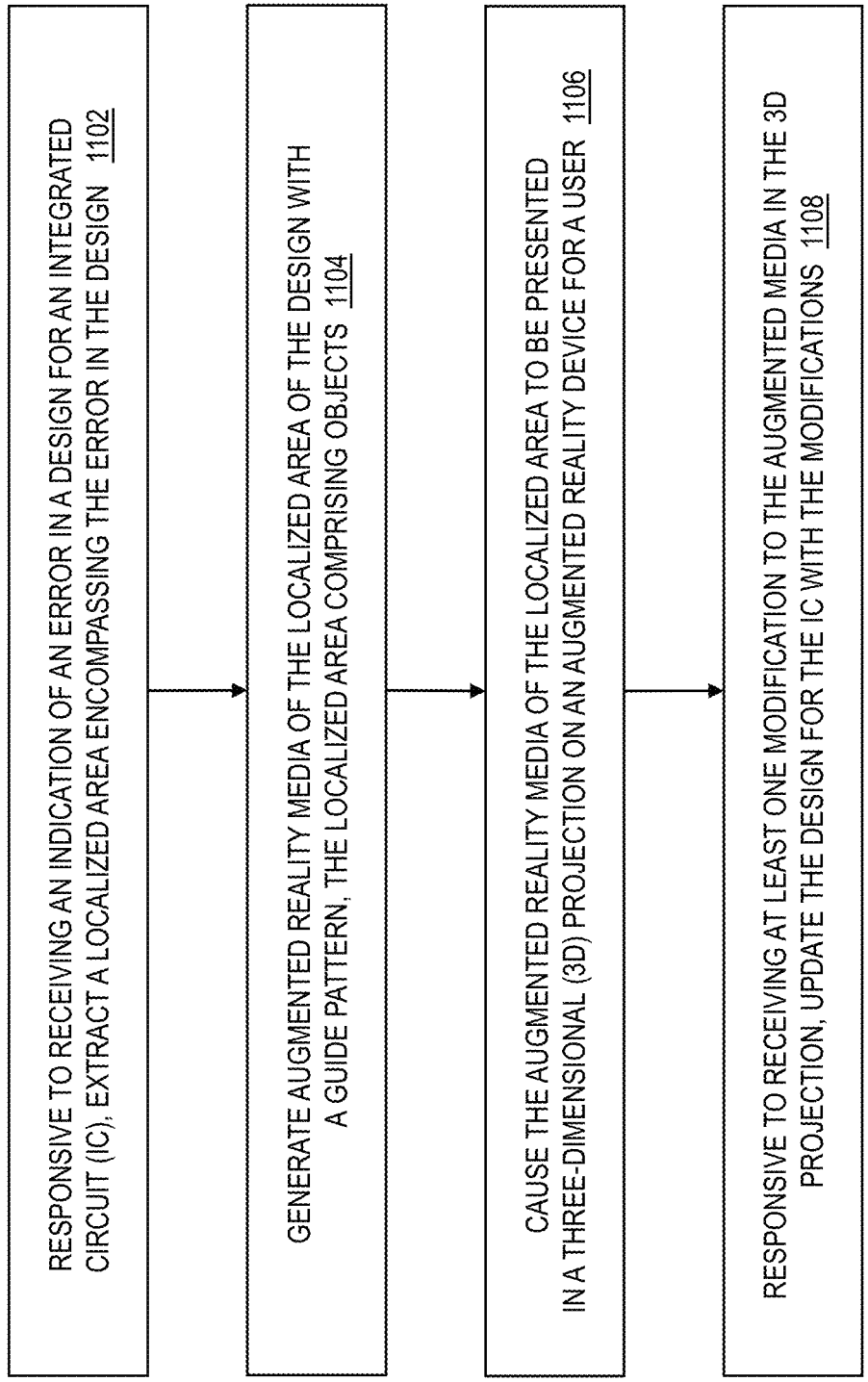
FIG. 11 is a flowchart of a computer-implemented method for using design context projection and wire editing in augmented reality media for an IC according to one or more embodiments of the present invention.

FIG. 11 is a flowchart of a computer-implemented method 1100 for using design context projection and wire editing in augmented media for an IC according to one or more embodiments of the invention. At block 1102 of the method 1100, software applications 204 are configured to, responsive to receiving an indication of an error in a design 220 for an integrated circuit, extract a localized area/region encompassing the error in the design 220. At block 1104, software applications 204 are configured to generate augmented reality media 216 of the localized area of the design 220 with a guide pattern (e.g., track pattern), the localized area comprising objects. At block 1106, software applications 204 are configured to cause the augmented reality media 216 of the localized area to be presented in a three-dimensional (3D) projection on an augmented reality device 124 for a user. At block 1108, software applications 204 are configured to, responsive to receiving at least one modification to the augmented media in the 3D projection, update the design 220 for the IC with the modifications.

The guide (e.g., track pattern) is incorporated in the 3D projection of the augmented media, the guide providing a pattern (e.g., track pattern) for modifying the objects in the localized area. The objects (e.g., metal layers, vias) comprise one or more routing layers. The objects in the localized area comprise one or more metal layers, the at least one modification comprising an update to the one or more metal layers. A size of the localized area is adjusted according to a type of the error in the design. Generating the augmented reality media 216 of the localized area of the design comprises selectively converting the objects into a 3D format, the objects being selected based on a type of the error. Updating the design for the IC with the modifications fixes the error in the design.

Figure 12:
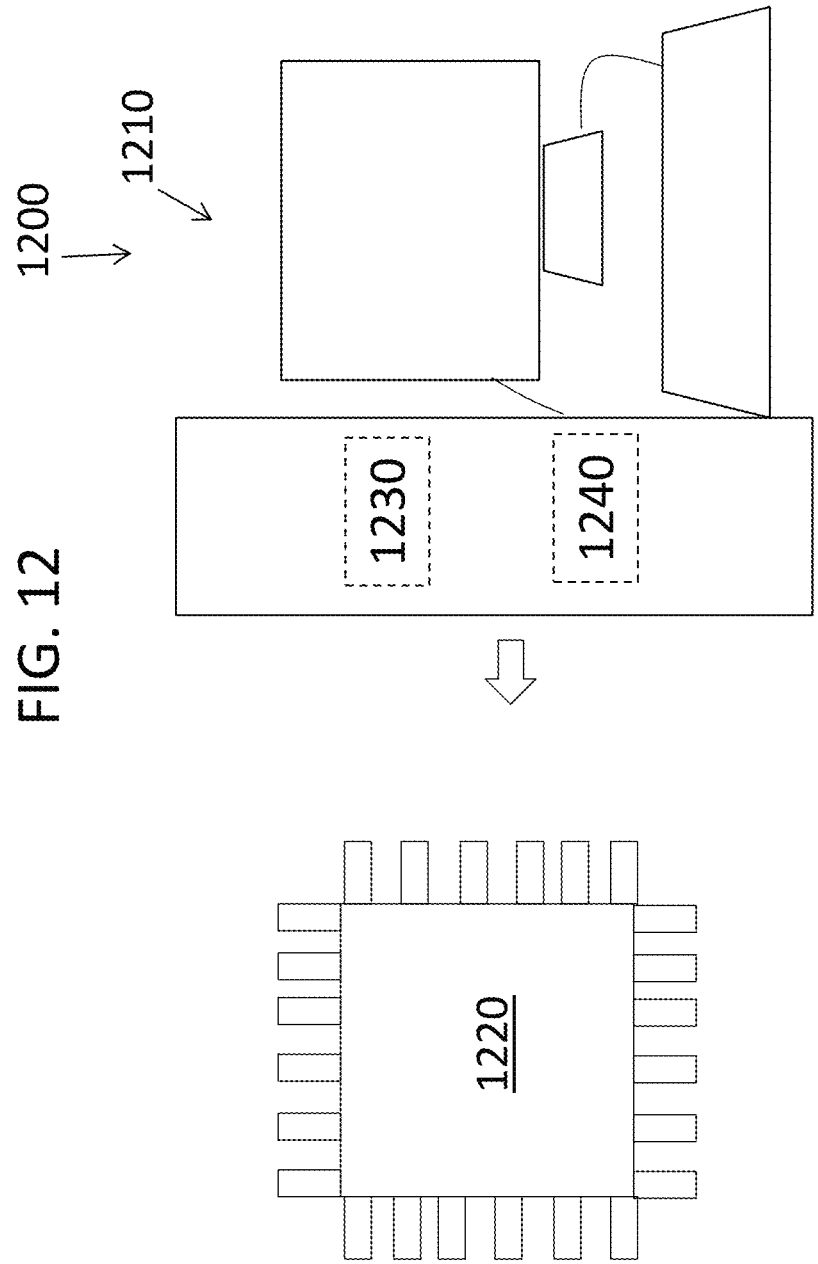
FIG. 12 is a block diagram of a system to design/layout an IC using design context projection and wire editing in augmented reality media for the IC in accordance with one or more embodiments of the present invention.

FIG. 12 is a block diagram of a system 1200 according to embodiments of the invention. The system 1200 includes processing circuitry 1210 used to generate the design 1230 that is ultimately fabricated into an integrated circuit 1220, using design context projection and wire editing in augmented media for the IC. The steps involved in the fabrication of the integrated circuit 1220 are well-known and briefly described herein. Once the physical layout 1240 is finalized, based, in part, on using design context projection and wire editing in augmented media for the IC according to embodiments of the invention, the finalized physical layout 1240 is provided to a foundry. Masks are generated for each layer of the integrated circuit based on the finalized physical layout. Then, the wafer is processed in the sequence of the mask order. The processing includes photolithography and etch. This is further discussed with reference to FIG. 13.

FIG. 13 is a process flow of a method of fabricating the integrated circuit according to exemplary embodiments of the invention. Once the physical design data is obtained, based, in part, using design context projection and wire editing in augmented media for the IC, the integrated circuit 1220 can be fabricated according to known processes that are generally described with reference to FIG. 13. Generally, a wafer with multiple copies of the final design is fabricated and cut (i.e., diced) such that each die is one copy of the integrated circuit 1220. At block 1310, the processes include fabricating masks for lithography based on the finalized physical layout. At block 1320, fabricating the wafer includes using the masks to perform photolithography and etching. Once the wafer is diced, testing and sorting each die is performed, at block 1330, to filter out any faulty die.

Various embodiments of the present invention are described herein with reference to the related drawings. Alternative embodiments can be devised without departing from the scope of this invention. Although various connections and positional relationships (e.g., over, below, adjacent, etc.) are set forth between elements in the following description and in the drawings, persons skilled in the art will recognize that many of the positional relationships described herein are orientation-independent when the described functionality is maintained even though the orientation is changed. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to forming layer "A" over layer "B" include situations in which one or more intermediate layers (e.g., layer "C") is between layer "A" and layer "B" as long as the relevant characteristics and functionalities of layer "A" and layer "B" are not substantially changed by the intermediate layer(s).

The phrase "selective to," such as, for example, "a first element selective to a second element," means that the first element can be etched and the second element can act as an etch stop.

As used herein, "p-type" refers to the addition of impurities to an intrinsic semiconductor that creates deficiencies of valence electrons. In a silicon-containing substrate, examples of p-type dopants, i.e., impurities, include but are not limited to: boron, aluminum, gallium and indium.

As used herein, "n-type" refers to the addition of impurities that contributes free electrons to an intrinsic semiconductor. In a silicon containing substrate examples of n-type dopants, i.e., impurities, include but are not limited to antimony, arsenic and phosphorous.

As previously noted herein, for the sake of brevity, conventional techniques related to semiconductor device and integrated circuit (IC) fabrication may or may not be described in detail herein. By way of background, however, a more general description of the semiconductor device fabrication processes that can be utilized in implementing one or more embodiments of the present invention will now be provided. Although specific fabrication operations used in implementing one or more embodiments of the present invention can be individually known, the described combination of operations and/or resulting structures of the present invention are unique. Thus, the unique combination of the operations described in connection with the fabrication of a semiconductor device according to the present invention utilize a variety of individually known physical and chemical processes performed on a semiconductor (e.g., silicon) substrate, some of which are described in the immediately following paragraphs.

In general, the various processes used to form a microchip that will be packaged into an IC fall into four general categories, namely, film deposition, removal/etching, semiconductor doping and patterning/lithography. Deposition is any process that grows, coats, or otherwise transfers a material onto the wafer. Available technologies include physical vapor deposition (PVD), chemical vapor deposition (CVD), electrochemical deposition (ECD), molecular beam epitaxy (MBE) and more recently, atomic layer deposition (ALD) among others. Removal/etching is any process that removes material from the wafer. Examples include etch processes (either wet or dry), and chemical-mechanical planarization (CMP), and the like. Semiconductor doping is the modification of electrical properties by doping, for example, transistor sources and drains, generally by diffusion and/or by ion implantation. These doping processes are followed by furnace annealing or by rapid thermal annealing (RTA). Annealing serves to activate the implanted dopants. Films of both conductors (e.g., poly-silicon, aluminum, copper, etc.) and insulators (e.g., various forms of silicon dioxide, silicon nitride, etc.) are used to connect and isolate transistors and their components. Selective doping of various regions of the semiconductor substrate allows the conductivity of the substrate to be changed with the application of voltage. By creating structures of these various components, millions of transistors can be built and wired together to form the complex circuitry of a modern microelectronic device.

As noted above, atomic layer etching processes can be used in the present invention for via residue removal, such as can be caused by via misalignment. The atomic layer etch process provide precise etching of metals using a plasma-based approach or an electrochemical approach. The atomic layer etching processes are generally defined by two well-defined, sequential, self-limiting reaction steps that can be independently controlled. The process generally includes passivation followed selective removal of the passivation layer and can be used to remove thin metal layers on the order of nanometers. An exemplary plasma-based approach generally includes a two-step process that generally includes exposing a metal such a copper to chlorine and hydrogen plasmas at low temperature (below 20° C.). This process generates a volatile etch product that minimizes surface contamination. In another example, cyclic exposure to an oxidant and hexafluoroacetylacetone (Hhfac) at an elevated temperature such as at 275° C. can be used to selectively etch a metal such as copper. An exemplary electrochemical approach also can include two steps. A first step includes surface-limited sulfidization of the metal such as copper to form a metal sulfide, e.g., $Cu_2S$, followed by selective wet etching of the metal sulfide, e.g., etching of $Cu_2S$ in HCl. Atomic layer etching is relatively recent technology and optimization for a specific metal is well within the skill of those in the art. The reactions at the surface provide high selectivity and minimal or no attack of exposed dielectric surfaces.

Semiconductor lithography is the formation of three-dimensional relief images or patterns on the semiconductor substrate for subsequent transfer of the pattern to the substrate. In semiconductor lithography, the patterns are formed by a light sensitive polymer called a photoresist. To build the complex structures that make up a transistor and the many wires that connect the millions of transistors of a circuit, lithography and etch pattern transfer steps are repeated multiple times. Each pattern being printed on the wafer is aligned to the previously formed patterns and slowly the conductors, insulators and selectively doped regions are built up to form the final device.

The photoresist can be formed using conventional deposition techniques such chemical vapor deposition, plasma vapor deposition, sputtering, dip coating, spin-on coating, brushing, spraying and other like deposition techniques can be employed. Following formation of the photoresist, the photoresist is exposed to a desired pattern of radiation such as X-ray radiation, extreme ultraviolet (EUV) radiation, electron beam radiation or the like. Next, the exposed photoresist is developed utilizing a conventional resist development process.

After the development step, the etching step can be performed to transfer the pattern from the patterned photoresist into the interlayer dielectric. The etching step used in forming the at least one opening can include a dry etching process (including, for example, reactive ion etching, ion beam etching, plasma etching or laser ablation), a wet chemical etching process or any combination thereof.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e., two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   responsive to receiving an indication of an error in a design for an integrated circuit (IC), extracting a localized area encompassing the error in the design;
   generating augmented reality media of the localized area of the design with a guide pattern, the localized area comprising objects;
   causing the augmented reality media of the localized area to be presented in a three-dimensional (3D) projection on an augmented reality device for a user, the guide pattern comprising a first track pattern that is determined to match a first type of the objects in the 3D projection, the first track pattern being different from a second track pattern matching a second type of the objects; and
   responsive to receiving at least one modification to the augmented reality media in the 3D projection, updating the design for the IC with the at least one modification.

2. The method of claim 1, wherein the guide pattern is incorporated in the 3D projection of the augmented reality media, the guide pattern providing the first track pattern for modifying the first type of the objects in the localized area, the first track pattern being superimposed on the objects in the localized area of the design in the 3D projection.

3. The method of claim 1, wherein the objects comprise one or more routing layers.

4. The method of claim 1, wherein the objects in the localized area comprise one or more metal layers, the at least one modification comprising an update to the one or more metal layers.

5. The method of claim 1, wherein a size of the localized area is adjusted according to a type of the error in the design.

6. The method of claim 1, wherein generating the augmented reality media of the localized area of the design comprises selectively converting the objects into a 3D format, the objects being selected based on a type of the error.

7. The method of claim 1, wherein updating the design for the IC with the at least one modification fixes the error in the design.

8. A system comprising:
   a memory having computer readable instructions; and
   one or more processors for executing the computer readable instructions, the computer readable instructions controlling the one or more processors to perform operations comprising:
   responsive to receiving an indication of an error in a design for an integrated circuit (IC), extracting a localized area encompassing the error in the design;
   generating augmented reality media of the localized area of the design with a guide pattern, the localized area comprising objects;
   causing the augmented reality media of the localized area to be presented in a three-dimensional (3D) projection on an augmented reality device for a user, the guide pattern comprising a first track pattern that is determined to match a first type of the objects in the 3D projection, the first track pattern being different from a second track pattern matching a second type of the objects; and
   responsive to receiving at least one modification to the augmented reality media in the 3D projection, updating the design for the IC with the at least one modification.

9. The system of claim 8, wherein the guide pattern is incorporated in the 3D projection of the augmented reality media, the guide pattern providing a the first track pattern for modifying the first type of the objects in the localized area, the first track pattern being superimposed on the objects in the localized area of the design in the 3D projection.

10. The system of claim 8, wherein the objects comprise one or more routing layers.

11. The system of claim 8, wherein the objects in the localized area comprise one or more metal layers, the at least one modification comprising an update to the one or more metal layers.

12. The system of claim 8, wherein a size of the localized area is adjusted according to a type of the error in the design.

13. The system of claim 8, wherein generating the augmented reality media of the localized area of the design comprises selectively converting the objects into a 3D format, the objects being selected based on a type of the error.

14. The system of claim 8, wherein updating the design for the IC with the at least one modification fixes the error in the design.

15. A computer program product comprising a computer readable storage medium having program instructions embodied therewith, the program instructions executable by one or more processors to cause the one or more processors to perform operations comprising:
- responsive to receiving an indication of an error in a design for an integrated circuit (IC), extracting a localized area encompassing the error in the design;
- generating augmented reality media of the localized area of the design with a guide pattern, the localized area comprising objects;
- causing the augmented reality media of the localized area to be presented in a three-dimensional (3D) projection on an augmented reality device for a user, the guide pattern comprising a first track pattern that is determined to match a first type of the objects in the 3D projection, the first track pattern being different from a second track pattern matching a second type of the objects; and
- responsive to receiving at least one modification to the augmented reality media in the 3D projection, updating the design for the IC with the at least one modification.

16. The computer program product of claim 15, wherein the guide pattern is incorporated in the 3D projection of the augmented reality media, the guide pattern providing the first track pattern for modifying the first type of the objects in the localized area, the first track pattern being superimposed on the objects in the localized area of the design in the 3D projection.

17. The computer program product of claim 15, wherein the objects comprise one or more routing layers.

18. The computer program product of claim 15, wherein the objects in the localized area comprise one or more metal layers, the at least one modification comprising an update to the one or more metal layers.

19. The computer program product of claim 15, wherein a size of the localized area is adjusted according to a type of the error in the design.

20. The computer program product of claim 15, wherein generating the augmented reality media of the localized area of the design comprises selectively converting the objects into a 3D format, the objects being selected based on a type of the error.

* * * * *